US008836668B2

(12) United States Patent
Cok

(10) Patent No.: US 8,836,668 B2
(45) Date of Patent: Sep. 16, 2014

(54) TRANSPARENT TOUCH-RESPONSIVE CAPACITOR WITH VARIABLE-HEIGHT MICRO-WIRES

(75) Inventor: Ronald Steven Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 234 days.

(21) Appl. No.: 13/406,658

(22) Filed: Feb. 28, 2012

(65) Prior Publication Data

US 2013/0222326 A1 Aug. 29, 2013

(51) Int. Cl.
*G06F 3/045* (2006.01)

(52) U.S. Cl.
USPC ............... 345/174; 178/18.06; 178/19.03

(58) Field of Classification Search
CPC  G06F 3/044; G06F 3/047; G06F 2203/04111
USPC ............ 345/173–183; 178/18.01–18.11, 178/19.01–19.07, 20.01–20.04
See application file for complete search history.

(56) References Cited

U.S. PATENT DOCUMENTS

| 3,223,525 | A  |   | 12/1965 | Hendrik |         |
|-----------|----|---|---------|---------|---------|
| 4,705,919 | A  | * | 11/1987 | Dhawan  | 178/18.03 |
| 4,771,138 | A  | * | 9/1988  | Dhawan  | 178/18.03 |
| 6,329,044 | B1 | * | 12/2001 | Inoue et al. | 428/209 |
| 6,645,444 | B2 |   | 11/2003 | Goldstein |       |
| 6,812,637 | B2 |   | 11/2004 | Cok et al. |      |
| 7,663,607 | B2 |   | 2/2010  | Hotelling et al. | |
| 8,400,418 | B2 | * | 3/2013  | Matsuo | 345/174 |
| 2006/0057502 | A1 | | 3/2006 | Okada et al. | |
| 2006/0102461 | A1 | * | 5/2006 | Cok et al. | 200/512 |
| 2009/0219257 | A1 | | 9/2009 | Frey et al. | |
| 2010/0026664 | A1 | | 2/2010 | Geaghan | |
| 2010/0156840 | A1 | * | 6/2010 | Frey et al. | 345/174 |
| 2010/0231555 | A1 | * | 9/2010 | Mackey | 345/174 |
| 2011/0007011 | A1 | * | 1/2011 | Mozdzyn | 345/173 |
| 2011/0096005 | A1 | * | 4/2011 | Kim et al. | 345/173 |
| 2011/0096256 | A1 | * | 4/2011 | Nagata et al. | 349/33 |
| 2011/0099805 | A1 | | 5/2011 | Lee | |
| 2011/0115717 | A1 | | 5/2011 | Hable et al. | |
| 2011/0248953 | A1 | | 10/2011 | Lee et al. | |
| 2011/0289771 | A1 | | 12/2011 | Kuriki | |
| 2011/0308846 | A1 | | 12/2011 | Ichiki | |

FOREIGN PATENT DOCUMENTS

EP  2 390 771  5/2011

* cited by examiner

*Primary Examiner* — Gene W Lee
(74) *Attorney, Agent, or Firm* — Raymond L. Owens

(57) ABSTRACT

A touch-responsive capacitive apparatus includes a transparent substrate having first and second pad and interstitial areas. Pairs of first and second pad areas define corresponding touch-responsive capacitors. Electrically connected first pad micro-wires are formed in the first pad areas and electrically connected first interstitial micro-wires are formed in the first interstitial areas. The first pad micro-wires are electrically connected to the first interstitial wires. Electrically connected second pad micro-wires are formed in the second pad areas and electrically connected second interstitial micro-wires are formed in the second interstitial areas. The second pad micro-wires are electrically connected to the second interstitial wires. The height of at least a portion of the first interstitial micro-wires is greater than the height of at least a portion of the first pad micro-wires.

19 Claims, 21 Drawing Sheets

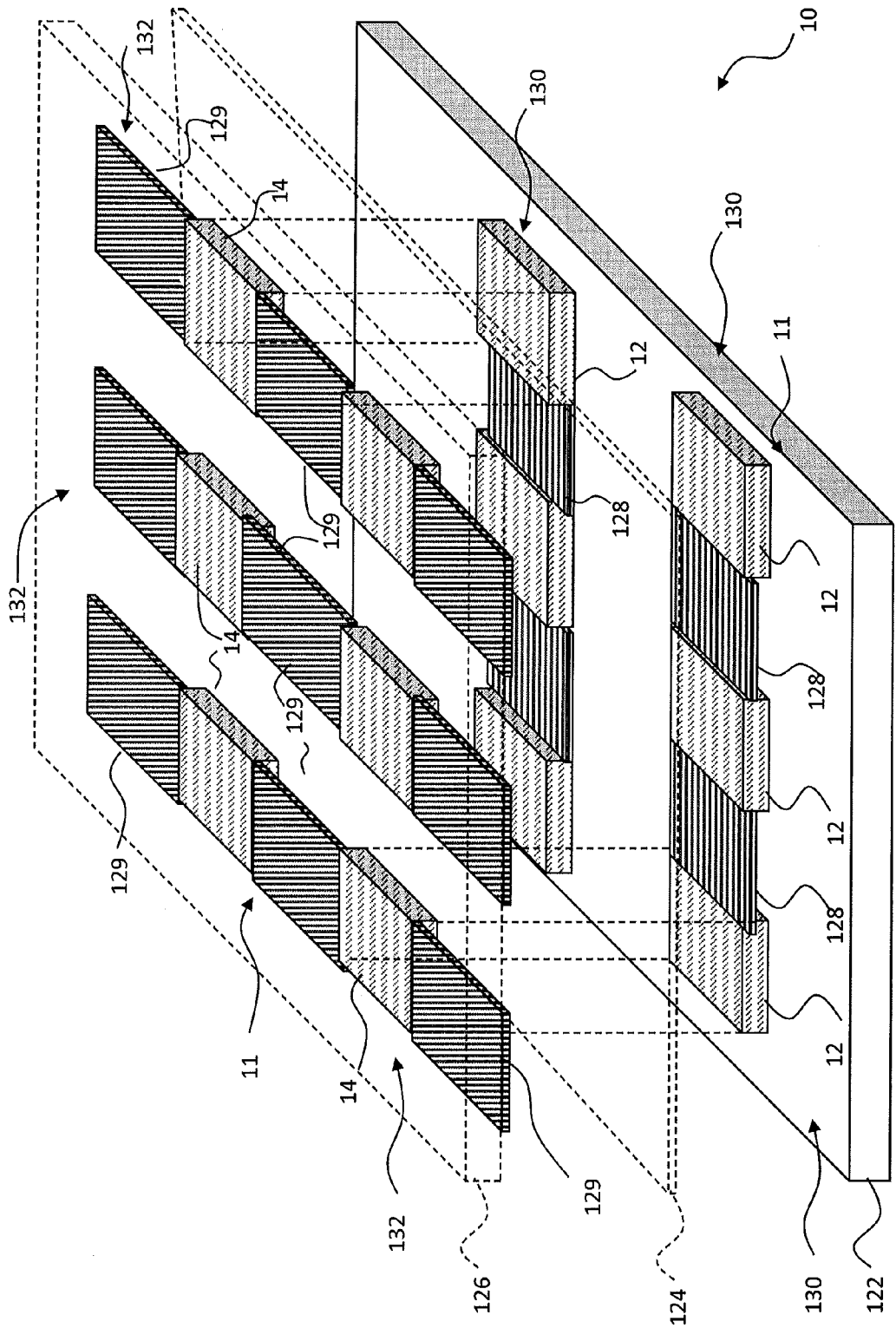

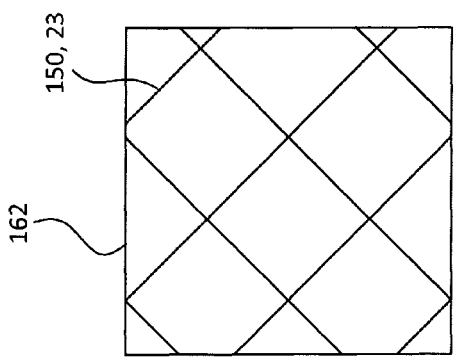
FIG. 19A
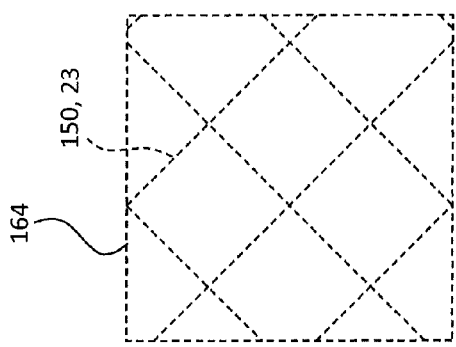
FIG. 19B
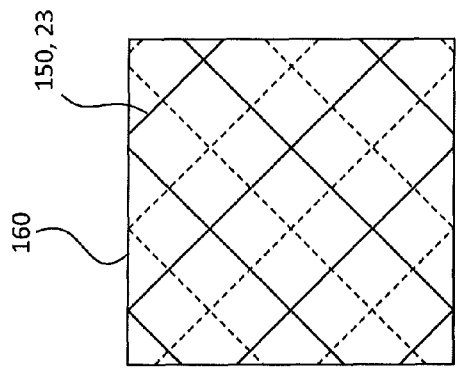
FIG. 19C
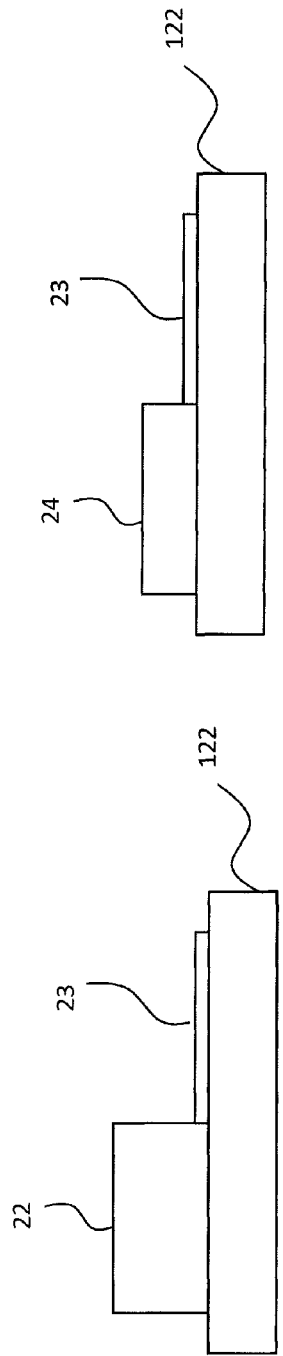
FIG. 20A
FIG. 20B

TRANSPARENT TOUCH-RESPONSIVE CAPACITOR WITH VARIABLE-HEIGHT MICRO-WIRES

CROSS REFERENCE TO RELATED APPLICATIONS

Reference is made to commonly-assigned, co-pending U.S. patent application Ser. No. 13/406,649, filed concurrently herewith, entitled "MAKING MICRO-WIRES WITH DIFFERENT HEIGHTS" by Ronald S. Cok, et al.; U.S. patent application Ser. No. 13/406,872, filed concurrently herewith, entitled "PATTERN-WISE DEFINING MICRO-WIRES WITH DIFFERENT HEIGHTS", by Ronald S. Cok; U.S. patent application Ser. No. 13/406,845, filed concurrently herewith, entitled "ELECTRONIC DEVICE HAVING METALLIC MICRO-WIRES", by Ronald S. Cok, et al.; U.S. patent application Ser. No. 13/406, 867, filed concurrently herewith, entitled "TOUCH SCREEN WITH DUMMY MICRO-WIRES", by Ronald S. Cok, et al., and U.S. patent application Ser. No. 13/406,649, filed concurrently herewith, entitled "TRANSPARENT TOUCH-RESPONSIVE CAPACITOR WITH VARIABLE-PATTERN MICRO-WIRES", by Ronald S. Cok, the disclosures of which are incorporated herein.

FIELD OF THE INVENTION

The present invention relates to transparent conductors and their use in capacitive touch screens.

BACKGROUND OF THE INVENTION

Transparent conductors are widely used in the flat-panel display industry to form electrodes that are used to electrically switch the light-emitting or light-transmitting properties of a display pixel, for example in liquid crystal or organic light-emitting diode displays. Transparent conductive electrodes are also used in touch screens in conjunction with displays. In such applications, the transparency and conductivity of the transparent electrodes are important attributes. In general, it is desired that transparent conductors have a high transparency (for example, greater than 90% in the visible spectrum) and a high conductivity (for example, less than 10 ohms/square).

Typical prior-art conductive electrode materials include indium tin oxide (ITO) and very thin layers of metal, for example silver or aluminum or metal alloys including silver or aluminum. These materials are coated, for example, by costly vacuum deposition methods such as sputtering or vapor deposition, and patterned on display or touch screen substrates, such as glass. Patterning is typically done by traditional multi-step lithographic processes. However, the current-carrying capacity of such electrodes is limited, thereby limiting the amount of power that can be supplied to the pixel elements. Moreover, the substrate materials are limited by the deposition process (e.g. sputtering). Thicker layers of metal oxides or metals increase conductivity but reduce the transparency of the electrodes.

Various methods of improving the conductivity of transparent conductors are taught in the prior art. For example, issued U.S. Pat. No. 6,812,637 entitled "OLED Display with Auxiliary Electrode" by Cok, describes an auxiliary electrode to improve the conductivity of the transparent electrode and enhance the current distribution. Such auxiliary electrodes are typically provided in areas that do not block light emission, e.g., as part of a black-matrix structure.

It is also known in the prior art to form conductive traces using nano-particles comprising, for example silver. The synthesis of such metallic nano-crystals is known. For example, issued U.S. Pat. No. 6,645,444 entitled "Metal nano-crystals and synthesis thereof" describes a process for forming metal nano-crystals optionally doped or alloyed with other metals. U.S. Patent Application Publication No. 2006/0057502 entitled "Method of forming a conductive wiring pattern by laser irradiation and a conductive wiring pattern" describes fine wirings made by drying a coated metal dispersion colloid into a metal-suspension film on a substrate, pattern-wise irradiating the metal-suspension film with a laser beam to aggregate metal nano-particles into larger conductive grains, removing non-irradiated metal nano-particles, and forming metallic wiring patterns from the conductive grains. However, such wires are not transparent and thus the number and size of the wires limits the substrate transparency as the overall conductivity of the wires increases.

Touch screens with transparent electrodes are widely used with electronic displays, especially for mobile electronic devices. Such devices typically include a touch screen mounted over an electronic display that displays interactive information. Touch screens mounted over a display device are largely transparent so that a user can view displayed information through the touch screen and readily locate a point on the touch screen to touch and thereby indicate the information relevant to the touch. By physically touching, or nearly touching, the touch screen in a location associated with particular information, a user can indicate an interest, selection, or desired manipulation of the associated particular information. The touch screen detects the touch and then electronically interacts with a processor to indicate the touch and touch location. The processor can then associate the touch and touch location with displayed information to execute a programmed task associated with the information. For example, graphic elements in a computer-driven graphic user interface are selected or manipulated with a touch screen mounted on a display that displays the graphic user interface.

Touch screens use a variety of technologies, including resistive, inductive, capacitive, acoustic, piezoelectric, and optical technologies. Such technologies and their application in combination with displays to provide interactive control of a processor and software program are well known in the art. Capacitive touch screens are of at least two different types: self-capacitive and mutual capacitive. Self-capacitive touch screens can employ an array of transparent electrodes, each of which in combination with a touching device (e.g. a finger or conductive stylus) forms a temporary capacitor whose capacitance can be detected. Mutual-capacitive touch screens can employ an array of transparent electrode pairs that form capacitors whose capacitance is affected by a conductive touching device. In either case, each capacitor in the array can be tested to detect a touch and the physical location of the touch-detecting electrode in the touch screen corresponds to the location of the touch. For example, U.S. Pat. No. 7,663,607 discloses a multipoint touch screen having a transparent capacitive sensing medium configured to detect multiple touches or near touches that occur at the same time and at distinct locations in the plane of the touch panel and to produce distinct signals representative of the location of the touches on the plane of the touch panel for each of the multiple touches. The disclosure teaches both self- and mutual-capacitance touch screens.

Referring to FIG. 10, a prior-art touch screen and display system 100 includes a display 110 with a corresponding touch screen 120 mounted with the display 110 so that information displayed on the display 110 is viewed through the touch screen 120. Graphic elements displayed on the display 110 can be selected, indicated, or manipulated by touching a corresponding location on the touch screen 120. The touch screen 120 includes a first transparent substrate 122 with first transparent electrodes 130 formed in the x-dimension on the first transparent substrate 122 and a second transparent substrate 126 with second electrodes 132 formed in the y-dimension facing the x-dimension first transparent electrodes 130 on the second transparent substrate 126. A dielectric layer 124 is located between the first and second transparent substrate 122, 126 and first and second transparent electrodes 130, 132. Referring also to the top view of FIG. 11, in this example first pad areas 128 in the first transparent electrodes 130 are located adjacent to second pad areas 129 in the second transparent electrodes 132. (The first and second pad areas 128, 129 are separated into different parallel planes by the dielectric layer 124.) The first and second transparent electrodes 130, 132 have a variable width and extend in orthogonal directions (for example as shown in U.S. Patent Publication Nos. 2011/0289771 and 2011/0099805, which are hereby incorporated by reference. When a voltage is applied across the first and second transparent electrodes 130, 132, electric fields are formed between the first pad areas 128 of the x-dimension first transparent electrodes 130 and the second pad areas 129 of the y-dimension second electrodes 132.

Another prior-art disclosure of a touch screen with variable-width electrodes and sensing cells is found in U.S. Patent Publication No. 2011/0248953. Conductive dummy patterns are located between adjacent sensing cells at different heights above a transparent substrate and the conductive dummy patterns partially overlap the sensing cells.

A display controller 142 controls the display 110 in coordination with a touch screen controller 140. The touch screen controller 140 is connected through electrical buss connections 136, 134 and controls the touch screen 120. The touch screen controller 140 detects touches on the touch screen 120 by sequentially electrically energizing and testing the x-dimension first and y-dimension second transparent electrodes 130, 132.

Referring to FIG. 12, in another prior-art embodiment, rectangular first and second transparent electrodes 130, 132 are arranged orthogonally on first transparent substrate 122, 126 with intervening dielectric layer 124, forming touch screen 120 which, in combination with the display 110 forms a touch screen and display system 100. First and second pad areas 128, 129 are formed where the first and second transparent electrodes 130, 132 overlap. The touch screen 120 and display 110 are controlled by touch screen and display controllers 140, 142 respectively, through electrical busses 136 and 134.

Since touch screens are largely transparent, any electrically conductive materials located in the transparent portion of the touch screen either employ transparent conductive materials (for example, transparent conductive metal oxides such as indium tin oxide) or employ conductive elements that are too small to be readily resolved by the eye of a touch screen user. Transparent conductive metal oxides are well known in the display and touch screen industry and have a number of disadvantages, including inadequate transparency and conductivity, high manufacturing costs due to vacuum processes and a tendency to crack under mechanical or environmental stress. Further, the high demand for indium has significantly increased the price of this raw material. Thus, touch screens including very fine patterns of conductive elements, such as metal wires or conductive traces can provide a useful alternative. For example, U.S. Patent Publication No. 2011/0007011 teaches a capacitive touch screen with a mesh electrode, as does U.S. Patent Publication No. 2010/0026664.

Referring to FIG. 13, a prior-art x- or y-dimension variable-width transparent electrode 130, 132 includes a micro-pattern 156 of micro-wires 150 arranged in a rectangular grid. The micro-wires 150 are multiple very thin metal conductive traces or wires formed on the first and second transparent substrates 122, 126 to form the x- and y-dimension transparent electrodes 130, 132. The micro-wires 150 are so thin that they are not readily visible to a human observer, for example 1 to 10 microns wide. The micro-wires 150 are typically opaque and spaced apart, for example by 50 to 500 microns, so that the first and second transparent electrodes 130, 132 appear to be transparent and the micro-wires 150 are not distinguished by an observer.

U.S. Patent Publication No. 2009/0219257 discloses a touch screen sensor that includes a visible light transparent substrate and an electrically conductive micro-pattern disposed on or in the visible light transparent substrate. The micro-pattern includes a first region micro-pattern with a first sheet resistance value and a second region micro-pattern with a second sheet resistance different from the first sheet resistance value. As disclosed, the second region sheet resistance is lower than the first and includes micro-breaks in the conductive micro-pattern.

Mutually-capacitive touch screens typically include arrays of capacitors whose capacitance is repeatedly tested to detect a touch. In order to detect touches rapidly, highly conductive electrodes are useful. In order to readily view displayed information on a display at a display location through a touch screen, it is useful to have a highly transparent touch screen. There is a need, therefore, for an improved method and apparatus for providing electrodes with increased conductivity and transparency in a mutually capacitive touch screen device.

SUMMARY OF THE INVENTION

In accordance with the present invention, a touch-responsive capacitive apparatus comprises:

a transparent substrate;

a plurality of electrically connected first pad micro-wires formed in a plurality of first pad areas in a first micro-wire layer and a plurality of electrically connected first interstitial micro-wires formed in a plurality of first interstitial areas in the first micro-wire layer, the first pad micro-wires electrically connected to the first interstitial wires;

a plurality of electrically connected second pad micro-wires formed in a plurality of second pad areas in a second micro-wire layer and a plurality of electrically connected second interstitial micro-wires formed in a plurality of second interstitial areas in the second micro-wire layer, the second pad micro-wires electrically connected to the second interstitial wires; and wherein pairs of first and second pad areas define corresponding touch-responsive capacitors, the transparent substrate supports the first or second micro-wire layers, and the height of at least a portion of the first interstitial micro-wires is greater than the height of at least a portion of the first pad micro-wires.

The present invention provides improved conductivity and performance for transparent micro-wire electrodes in electronic devices and mutually capacitive touch screens without deleteriously affecting the transparency or function of the apparatus.

These, and other, attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. For example, the summary descriptions above are not meant to describe individual separate embodiments whose elements are not interchangeable. Many of the elements described as related to a particular embodiment can be used together with, and interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIGS. 1A and 1B are exploded perspectives illustrating an embodiment of the present invention;

FIGS. 19A, 19B, and 19C are top-view schematics illustrating dummy areas and dummy micro-wires useful in understanding various embodiments of the present invention; and FIGS. 20A and 20B are cross-sections illustrating the relative heights of interstitial wires, pad micro-wires, and dummy micro-wires useful in understanding various embodiments of the present invention.

DETAILED DESCRIPTION OF THE INVENTION

Figure 1B:
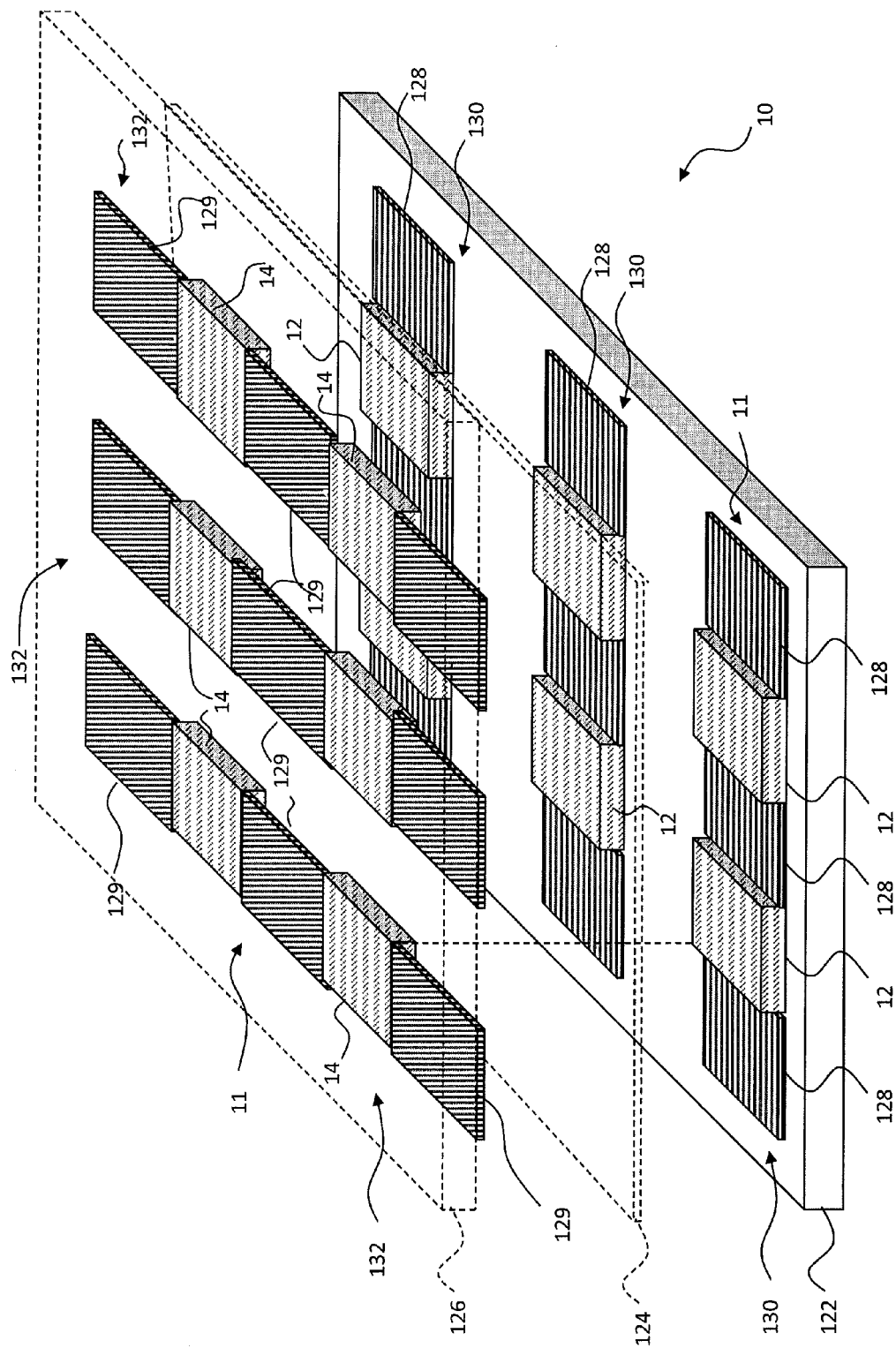

Referring to FIGS. 1A and 1B, according to an embodiment of the present invention, a touch-responsive capacitive apparatus 10 includes a first transparent substrate 122. A plurality of first pad areas 128 and first interstitial areas 12 are formed in a first micro-wire layer and a plurality of second pad areas 129 and second interstitial areas 14 are formed in a second micro-wire layer. Pairs of first and second pad areas 128, 129 define corresponding touch-responsive capacitors. The first or second micro-wire layers are supported by the first transparent substrate 122. Thus, the first or second pad areas 128, 129 and first or second interstitial areas 12, 14 can be formed upon one or the other sides of the first transparent substrate 122 or on layers located upon, over, under, or adjacent to one or the other sides of the first transparent substrate 122. As illustrated in the example of FIGS. 1A and 1B, the first pad areas 128 and first interstitial areas 12 are formed over the first transparent substrate 122 while the second pad areas 129 and second interstitial areas 14 are formed on a second transparent substrate 126 located over the first transparent substrate 122. The first and second transparent substrates 122, 126 are separated by a dielectric layer 124.

Figure 2A:
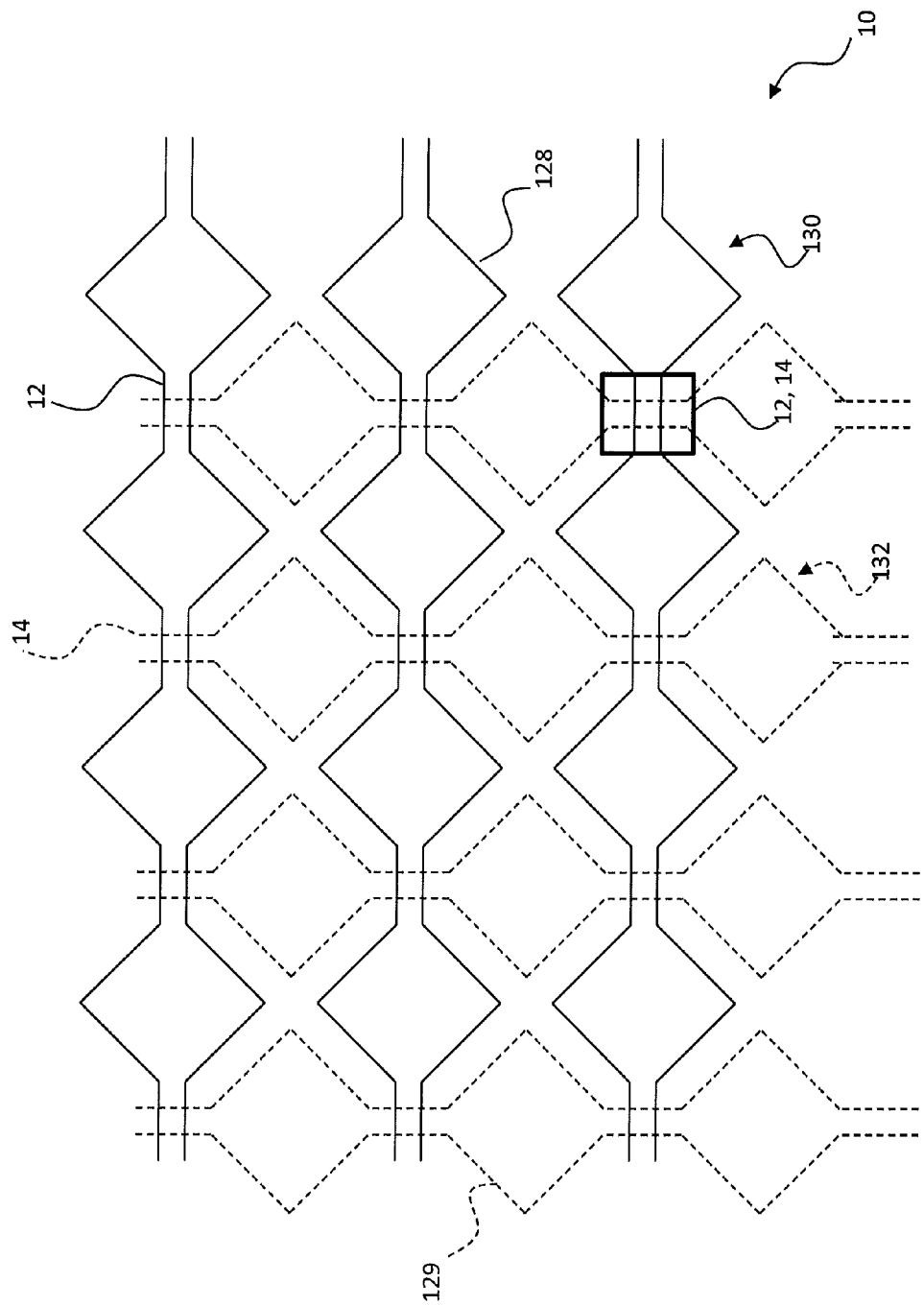
FIGS. 2A and 2B are top-view schematics illustrating an embodiment of the present invention.

As shown in FIG. 1A and referring further to the top view of FIG. 2A, the first pad areas 128 are adjacent to the second pad areas 129 and the first interstitial areas 12 overlap the second interstitial areas 14. As shown in FIG. 1B and referring further to FIG. 2B, the first pad areas 128 overlap the second pad areas 129 and the first interstitial areas 12 are adjacent to the second interstitial areas 14. In this embodiment, dummy areas 160 between pad and interstitial areas 128, 129, 12, 14 have no electrical functionality.

Figure 2B:
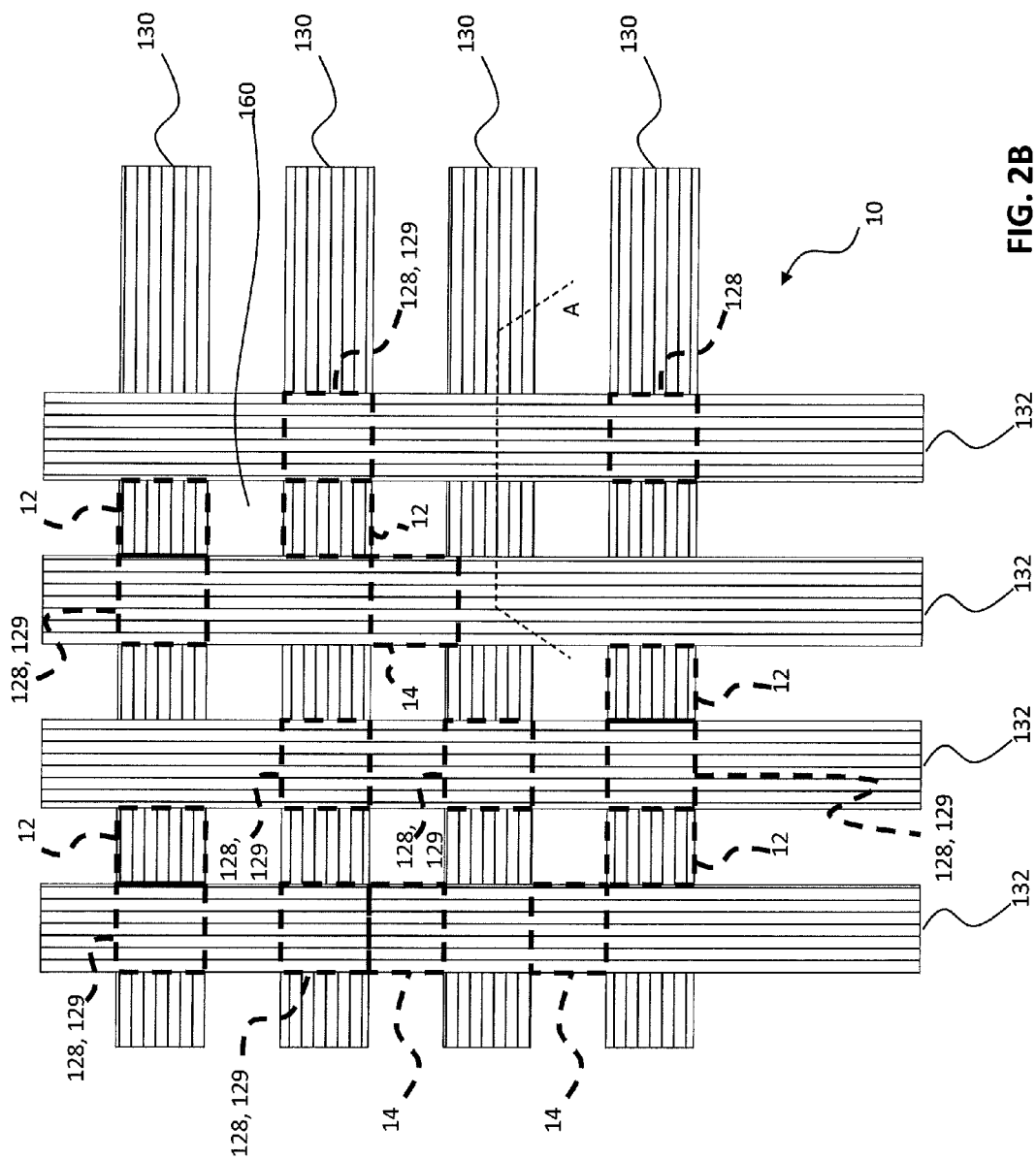
Figure 3:
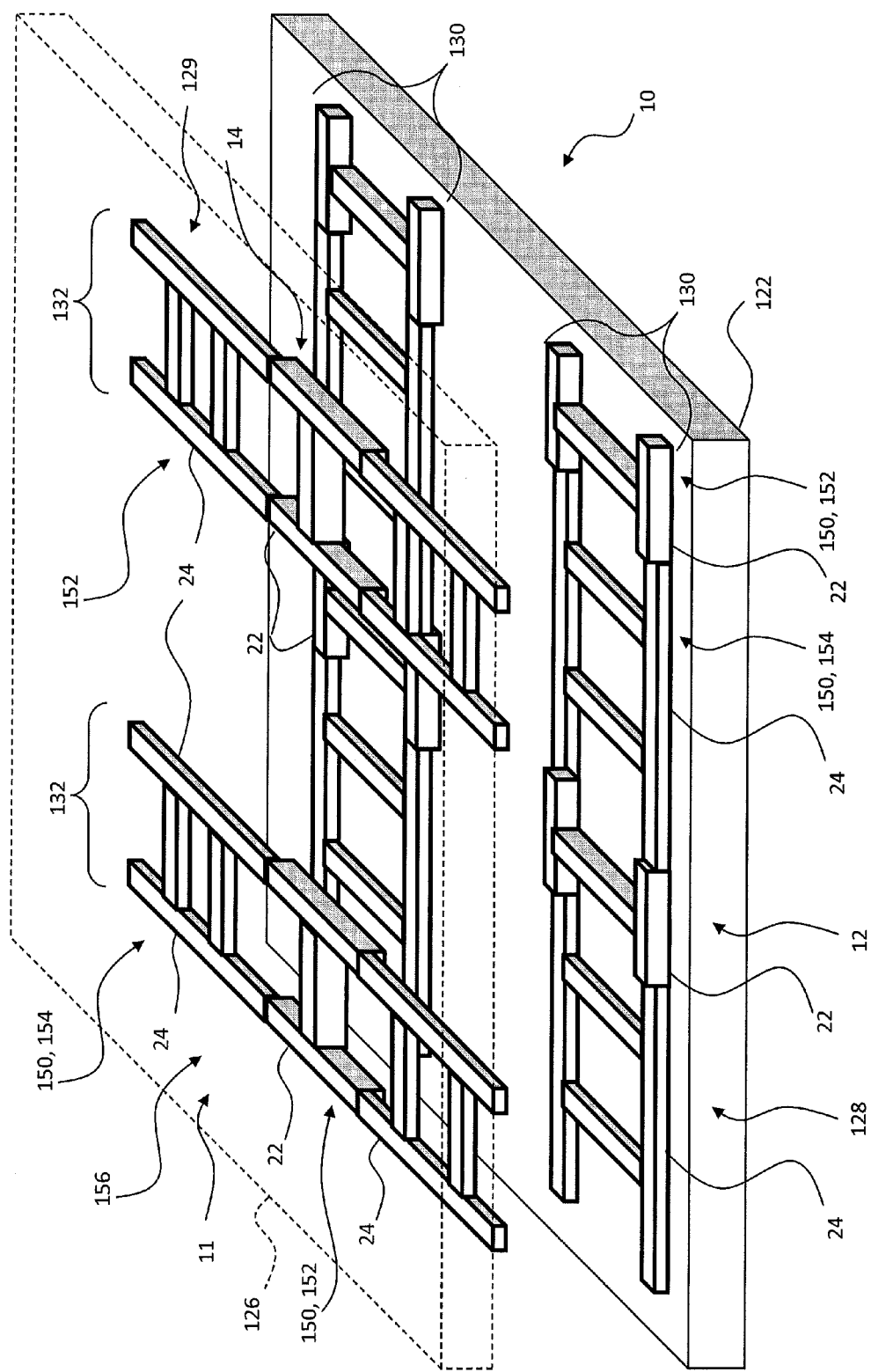
FIG. 3 is an exploded perspective illustrating an embodiment of the present invention.

Referring to FIG. 3 and corresponding to the example of FIG. 2B, micro-wires 150 form first and second transparent electrodes 130, 132 in the first and second micro-wire layers, respectively. A plurality of electrically connected pad micro-wires 24 are formed in the first pad areas 128 in the first micro-wire layer and a plurality of electrically connected interstitial micro-wires 22 are formed in the first interstitial areas 12 in the first micro-wire layer. The pad micro-wires 24 are electrically connected to the interstitial micro-wires 22 in the first micro-wire layer. Likewise, a plurality of electrically connected pad micro-wires 24 are formed in the second pad areas 129 in the second micro-wire layer and a plurality of electrically connected interstitial micro-wires 22 are formed in the second interstitial areas 14 in the second micro-wire layer. The pad micro-wires 24 are electrically connected to the interstitial micro-wires 22 in the second micro-wire layer. The height of at least a portion of the interstitial micro-wires 22 is greater than the height of at least a portion of the pad micro-wires 24. The interstitial or pad micro-wires form a micro-pattern of micro-wires. The interstitial and pad micro-wires 22, 24 can form the same or different micro-patterns of micro-wires 150.

First transparent electrodes 130 extending in the x-dimension are formed on the first transparent substrate 122. Second transparent electrodes 132 extending in the y-dimension are formed on the second transparent substrate 126. The second transparent substrate 126 is located above the first transparent substrate 122 and a dielectric layer 124 is located between the first and second transparent substrates 122, 126. The first pad areas 128 and the first interstitial areas 12 are spaced apart and do not overlap but can be contiguous. Likewise, the second pad areas 129 and the second interstitial areas 14 are spaced apart and do not overlap but can be contiguous. Touch-responsive capacitors are formed by the electric fields resulting from electrical charges placed on the pad micro-wires 24 in the first and second pad areas 128, 129 of the first and second transparent electrode 130, 132 separated by dielectric layer 124.

FIGS. 1A and 1B illustrate a first transparent substrate 122 on which the first transparent electrodes 130 are formed and a separate second transparent substrate 126 on which the second transparent electrodes 132 are formed above the first transparent substrate 122. However, other embodiments will suggest themselves to those skilled in the art. In the embodiment illustrated in FIGS. 1A, 1B, 3 and 4A, first transparent electrodes 130 are formed above a first transparent substrate 122 and second transparent electrodes 132 are formed beneath a separate second transparent substrate 126 located above the first transparent substrate 126 so that the first and second transparent electrodes 130, 132 are separated only by the dielectric layer 124 (not shown in FIGS. 2A, 2B, and 3). First transparent electrodes 130 include short pad micro-wires 24 having a height H2 in first pad areas 128 and tall interstitial micro-wires 22 having a height H1 greater than H2 in first interstitial areas 12. Second transparent electrodes 132 include short pad micro-wires 24 in second pad areas 129 having a height H2 and tall interstitial micro-wires 22 in second interstitial areas 14 having a height H1 greater than H2. As used herein, the height of a micro-wire 150 is the actual thickness (or depth) of the micro-wire 150 from the bottom surface of the micro-wire 150 to the opposed, top surface. The bottom surface can be considered the surface closest to the substrate (e.g. first or second transparent substrates 122, 126) on, over, or under which the micro-wire 150 is formed. The height of a micro-wire 150 is an attribute of the micro-wire 150 and does not refer to its location, for example the height of a micro-wire 150 does not refer to its general location above or below a substrate on, over, or under which it is located.

In an alternative embodiment of the present invention illustrated in FIG. 4B and discussed further below, a transparent substrate 123 having first transparent electrodes 130 including interstitial and pad micro-wires 22, 24 are located above one side of the transparent substrate 123 and second transparent electrodes 132 including interstitial and pad micro-wires 22, 24 are located below an opposing side of the transparent substrate 123 and the transparent substrate 123 is the dielectric layer 124. Again, first transparent electrodes 130 include short pad micro-wires 24 having a height 112 having a height H1 greater than H2 in first pad areas 128 and tall interstitial micro-wires 22 in first interstitial areas 12. Second transparent electrodes 132 include short pad micro-wires 24 in second pad areas 129 having a height H2 and tall interstitial micro-wires 22 in second interstitial areas 14 having a height H1 greater than H2.

The micro-wires 24 in the first pad areas 128 and second pad areas 129 form electric fields when energized with a charge.

The first transparent electrodes 130 have two different types of areas, first pad areas 128 and first interstitial areas 12. The first pad areas 128 and the first interstitial areas 12 of the first transparent electrode 130 are formed in a first micro-wire plane. Similarly, the second transparent electrodes 132 have two different types of areas, second pad areas 129 and second interstitial areas 14 (not shown in FIGS. 4A and 4B). The second pad areas 129 and the second interstitial areas 14 of the second transparent electrode 132 are formed in a second micro-wire plane different from the first micro-wire plane in which the first transparent electrode 130 is formed.

Figure 13:
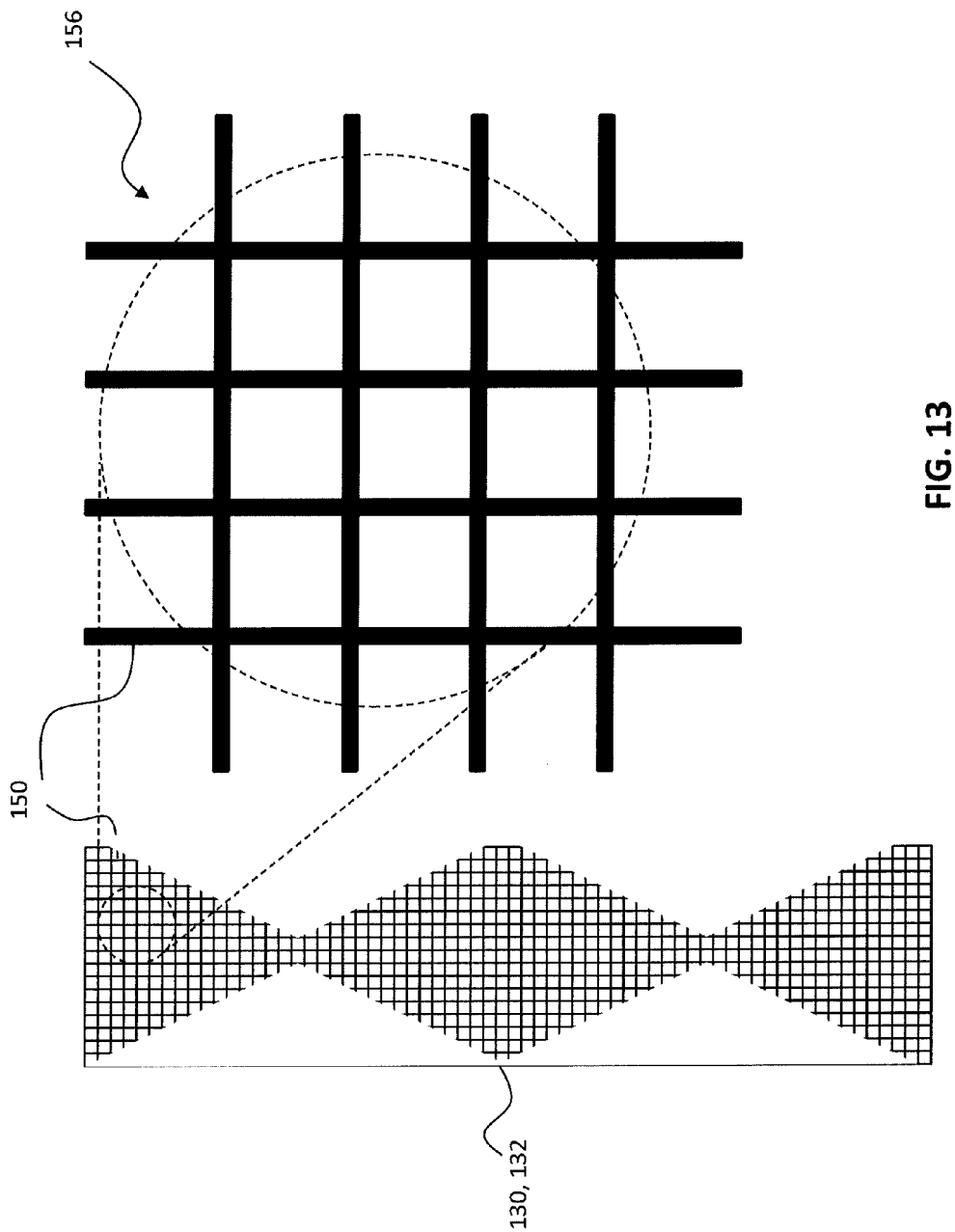
FIG. 13 is a prior-art schematic illustrating micro-wires in an apparently transparent electrode.

The first and second transparent electrodes 130, 132 are made up of micro-wires 150 in both the first and second pad areas 128, 129 and the first and second interstitial areas 12, 14 respectively. Micro-wires are relatively small conductive traces compared to the first pad areas 128, second pad areas 129, first interstitial areas 12, or second interstitial areas 14 so that the majority of the area over the first transparent substrate 122 (or second transparent substrate 126 or transparent substrate 123) is transparent and does not include micro-wires 150, as illustrated in prior art FIG. 13. In FIG. 13, the majority of the area in the first and second transparent electrodes 130, 132 is open space. Micro-wires can be metal, for example silver, gold, aluminum, nickel, tungsten, titanium, tin, or copper or various metal alloys including, for example silver, gold, aluminum, nickel, tungsten, titanium, tin, or copper. Alternatively, the first or second micro-wires 152, 154 (shown on FIGS. 3, 14-16, 18) can include cured or sintered metal particles such as nickel, tungsten, silver, gold, titanium, or tin or alloys such as nickel, tungsten, silver, gold, titanium, or tin. Other materials or methods for forming micro-wires 150 can be employed and are included in the present invention.

As used herein, micro-wires 150 in each electrode are micro-wires 150 formed in a micro-wire layer that forms a conductive mesh of electrically connected micro-wires 150. Thus, the pad micro-wires 24 in the first pad areas 128 are in the same micro-wire layer as the interstitial micro-wires 22 in the first interstitial areas 12. Similarly, the pad micro-wires 24 in the second pad areas 129 are in the same micro-wire layer as the interstitial micro-wires 22 in the second interstitial areas 14. A micro-wire layer is a layer in which there is no intervening layer between pad micro-wires 24 and interstitial micro-wires 22 on the same substrate side. Thus, the pad micro-wires 24 in the first pad areas 128 of the first transparent electrode 130 are in a first layer with the interstitial micro-wires 22 in the first interstitial areas 12 of the first transparent electrode 130. Similarly, the pad micro-wires 24 in the second pad areas 129 of the second transparent electrode 132 are in a second different micro-wire layer with the interstitial micro-wires 22 in the second interstitial areas 14 of the second transparent electrode 132. In particular, a micro-wire 150 that passes over another micro-wire 150 is no longer in the same micro-wire layer as the other micro-wire 150. Also, a micro-wire 150 that is electrically connected to another micro-wire 150 through a via is no longer in the same micro-wire layer as the other micro-wire 150. If a transparent substrate is planar, for example, a rigid planar substrate such as a glass substrate, the micro-wires 150 in a layer are similarly formed in, or on, a common plane. If a transparent substrate is flexible and curved, for example, a plastic substrate, the micro-wires 150 in a micro-wire layer are a conductive electrically connected mesh that is a common distance from a surface of the plastic substrate.

Figure 4A:
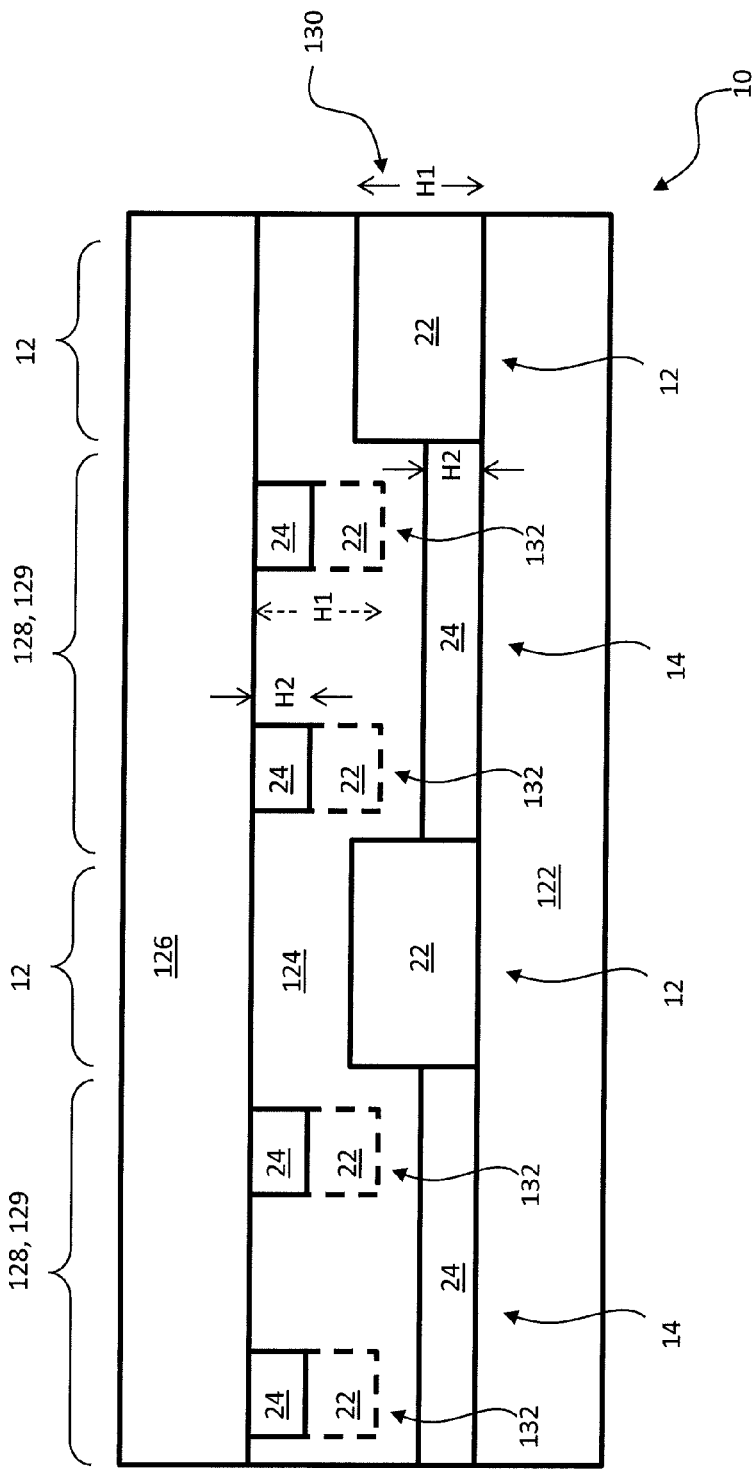
FIGS. 4A and 4B are cross-sections illustrating embodiments of the present invention.

The micro-wires 150 can be formed on a transparent substrate 123 or on a layer above (or beneath) the transparent substrate 123. The pad and interstitial micro-wires 24, 22 for each of the first and second transparent electrodes 130, 132 can be formed on opposing sides of the same transparent substrate 123 (e.g. as shown in FIG. 4B) or on facing sides of separate transparent substrates 122, 126 (e.g. as shown in FIG. 4A). Although some of the micro-wires 150 (e.g. 22) in a transparent electrode (e.g. 130) are taller than other of the micro-wires 150 (e.g. 24) in the transparent electrode (e.g. 130), they are considered to be in the same common plane because continuous portions of the micro-wires 150 are at a common distance from the transparent substrate.

The pad micro-wires 24 in the first pad areas 128 or the interstitial micro-wires 22 in the first interstitial areas 12 of a first transparent electrode 130 are electrically interconnected within the first pad areas 128 and within the first interstitial areas 12. Likewise, the pad micro-wires 24 in the second pad areas 129 or the interstitial micro-wires 22 in the second interstitial areas 14 of a second transparent electrode 132 are electrically interconnected within the second pad areas 129 and within the second interstitial areas 14. The interstitial or pad micro-wires 22, 24 of the first transparent electrode 130 are not electrically connected to the interstitial or pad micro-wires 22, 24 of the second transparent electrode 132, as such an electrical connection would cause an electrical short across the touch-responsive capacitors.

The height of the interstitial micro-wires 22 in the first interstitial areas 12 of the first transparent electrode 130 is greater than the height of the pad micro-wires 24 in the first pad areas 128 of the first transparent electrode 130. Likewise, the height of the interstitial micro-wires 22 in the second interstitial areas 14 of the second transparent electrode 132 is greater than the height of the pad micro-wires 24 in the second pad areas 129 of the second transparent electrode 132. The height of a micro-wire 150 is the vertical thickness of the micro-wire 150 on the transparent substrate (e.g. 123) surface and is distinguished from the width or length of the micro-wire 150 across the extent of the transparent substrate (e.g. 123) on, above, or below which it is formed. It does not refer to, for example, the vertical distance from the substrate or separation between substrates or substrate layers. Thus, the conductivity of the interstitial micro-wires 22 in the first interstitial areas 12 is greater than the conductivity of the pad micro-wires 24 in the first pad areas 128 of the first transparent electrode 130 because it is thicker and has a greater wire cross section. Likewise, the conductivity of the interstitial micro-wires 22 in the second interstitial areas 14 is greater than the conductivity of the pad micro-wires 24 in the second pad areas 129 of the second transparent electrode 132 because it is thicker and has a greater wire cross section. Hence, according to embodiments of the present invention, the overall conductivity of the first and second transparent electrodes 130, 132 are increased and the resistivity reduced.

Since, in a capacitor array formed by overlapping or adjacent orthogonal transparent electrodes (e.g. 130, 132) each capacitor is electrically tested to determine its capacitance and to detect a touch, the RC time constant of the circuit formed by each pair of electrodes limits the rate at which the capacitors can be tested. The RC time constant can be reduced by increasing the conductivity and reducing the resistance (R) of the electrodes. By increasing electrode conductivity and therefore the rate at which the capacitors are tested, faster performance and better user response is provided. Alternatively or in addition, an increase in the number of capacitors is enabled, providing increased resolution in a capacitor array. Hence, the present invention can provide improved and faster performance and increased resolution of touch screen capacitor arrays.

In another embodiment of the present invention, the width of the interstitial micro-wires 22 in the first interstitial area 12 is the same as the width of the pad micro-wires 24 in the first pad area 128.

The exploded perspectives of FIGS. 1A and 1B illustrate first transparent electrodes 130 formed on a first transparent substrate 122 facing orthogonal second transparent electrodes 132 on a second transparent substrate 126. First interstitial areas 12 on the first transparent substrate 122 are shown taller than the first pad areas 128 of the first transparent electrode 130 to indicate that the interstitial micro-wires 22 (not shown) making up the conductive elements of the first transparent electrode 130 in the first interstitial areas 12 are taller than the pad micro-wires 24 (not shown) making up the conductive elements of the first transparent electrode 130 in the first pad areas 128. Similarly, second interstitial areas 14 on the second transparent substrate 126 are shown taller than the second pad areas 129 of the second transparent electrode 132 to indicate that the interstitial micro-wires 22 (not shown) making up the conductive elements of the second transparent electrode 132 in the second interstitial areas 14 are taller than the pad micro-wires 24 making up the conductive elements of the second transparent electrode 132 in the second pad areas 129. Micro-wires 150 are not shown in FIG. 1A or 1B.

The top view of the touch-responsive capacitor apparatus 10 in FIGS. 2A and 2B illustrate the first and second orthogonal transparent electrodes 130, 132. In FIG. 2B, some of the first and second pad areas 128, 129 are indicated with heavy dashed rectangles. Some of the first and second interstitial areas 12, 14 are similarly indicated with heavy dashed rectangles. There are some areas in which there are no electrodes; electrically disconnected micro-wires 150 (not shown) can be located in such areas to maintain optical similarity over the surface of the transparent substrates e.g. 122, 126 (not shown).

The exploded perspective of the touch-responsive capacitor apparatus 10 in FIG. 3 illustrates first transparent electrodes 130 formed on a first transparent substrate 122 facing orthogonal second transparent electrodes 132 on a second transparent substrate 126. The first and second orthogonal transparent electrodes 130, 132 are each shown with parallel and orthogonal micro-wires 150 forming a grid micro-pattern 156 in each first and second electrode 130, 132. (For clarity, only a few micro-wires 150 for each first and second transparent electrode 130, 132 are illustrated. In actual practice, many micro-wires 150 would be used to extend to the edges of the first and second transparent electrodes 130, 132.) The pad micro-wires 24 in the first and second pad areas 128, 129 are shown shorter than the interstitial micro-wires 22 in the first or second interstitial areas 12, 14. The micro-pattern 156 defines the relative locations and orientations of the micro-wires 150 and is independent of the transparent electrode pattern, although both can be rectangular arrays. In other embodiments, the micro-pattern is different from the electrode pattern or is at a different orientation from the electrode pattern. For example, as illustrated in FIG. 13, the micro-pattern forms a regular grid array while the electrode pattern forms a variable width diamond structure.

As illustrated in FIGS. 1A, 1B, 2A, 2B, and 3, each first transparent electrode 130 includes multiple first pad areas 128 and multiple first interstitial areas 12. The pad and interstitial micro-wires 24, 22 of the multiple first pad areas 128 and multiple first interstitial areas 12, are electrically connected. Each first interstitial area 12 electrically connects one or more first pad areas 128. In an embodiment, the first interstitial areas 12 are interspersed between first pad areas 128 so that each first transparent electrode 130 includes alternating first pad areas 128 separated by alternating first interstitial areas 12 (except at the ends of the first electrodes). Likewise, the second interstitial areas 14 are interspersed between second pad areas 129 so that each second transparent electrode 132 includes alternating second pad areas 129 separated by alternating second interstitial areas 14 (except at the ends of the second electrode). The first and second transparent electrodes 130, 132 can be orthogonal or extend in different first and second directions over a transparent substrate (e.g. 122, 123, 126). In the embodiment of FIG. 2A, gaps between the first transparent electrodes 130 form the second interstitial areas 14 in the second transparent electrode 132 while the gaps between the second transparent electrodes 132 can form the first interstitial areas 12 in the first transparent electrodes 130. In the embodiment of FIG. 2B, gaps between the first transparent electrodes 130 form the second interstitial areas 14 in the second transparent electrode 132 while the gaps between the second transparent electrodes 132 can form the first interstitial areas 12 in the first transparent electrodes 130.

Figure 11:
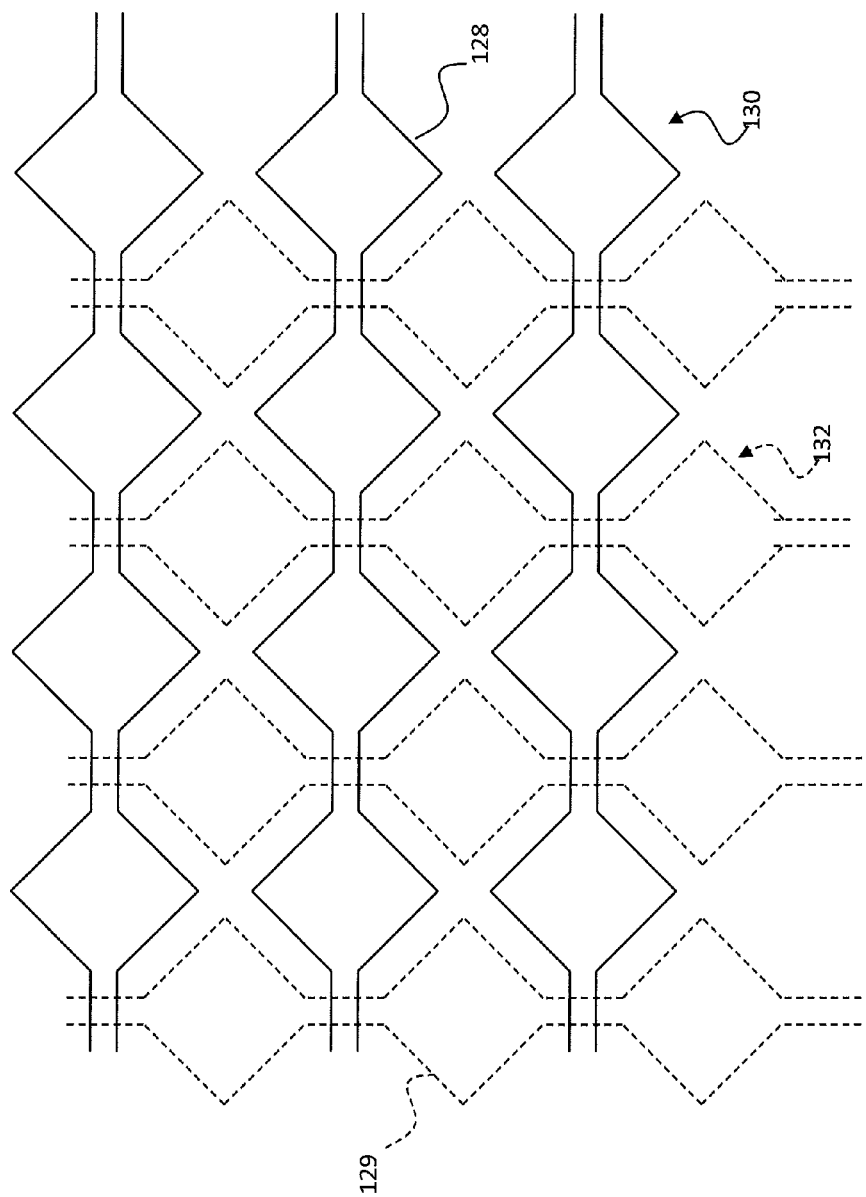
FIG. 11 is a prior-art schematic illustrating pad areas in a capacitive touch screen.
Figure 12:
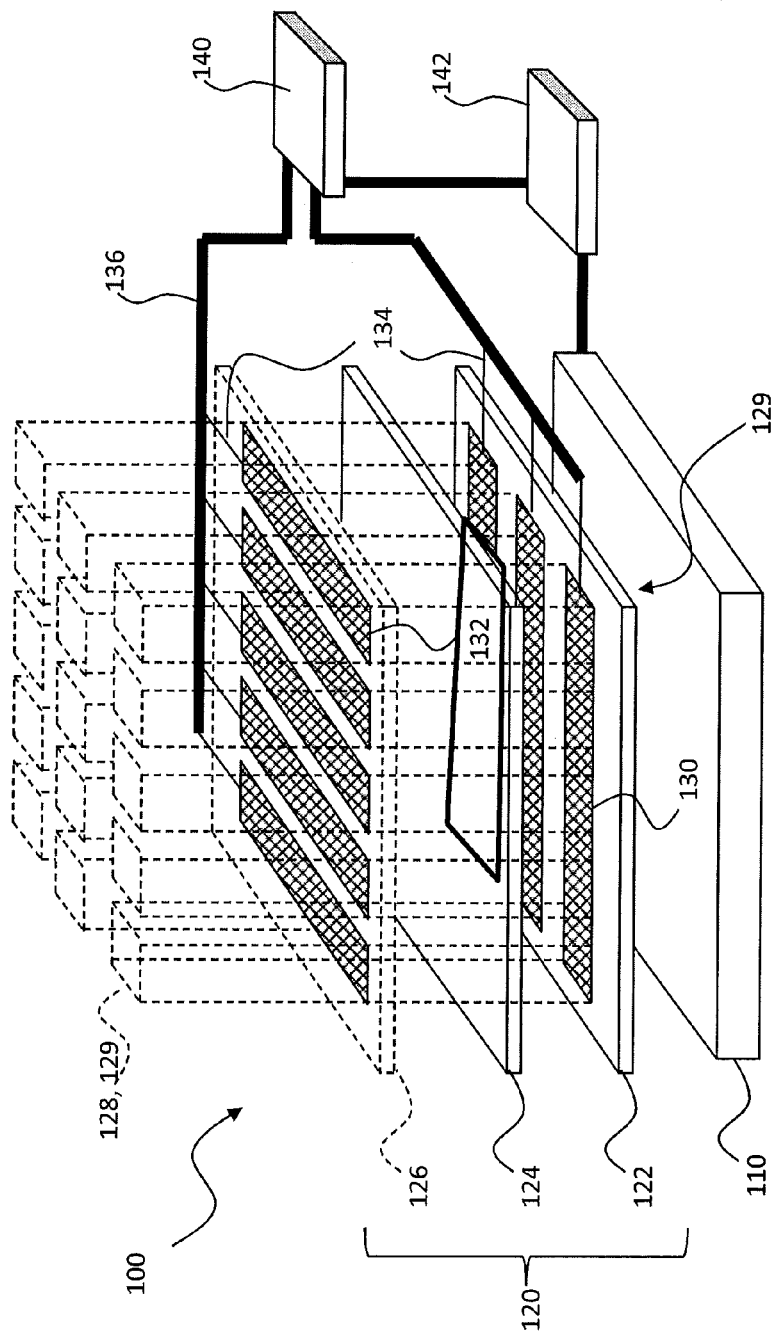
FIG. 12 is a prior-art exploded perspective illustrating a mutual capacitive touch screen having overlapping pad areas in conjunction with a display and controllers.

In an example and non-limiting embodiment of the present invention, each micro-wire is 5 microns wide and separated from neighboring parallel micro-wires 150 in an electrode by a distance of 50 microns, so that the electrode is 90% transparent. As used herein, transparent refers to elements that transmit at least 50% of incident visible light. The micro-wires 150 can be arranged in a grid micro-pattern (as illustrated in FIGS. 3 and 11) that is unrelated to the pattern of the electrodes. Other micro-patterns are also used in other embodiments and the present invention is not limited by the micro-pattern of the micro-wires 150 or the pattern of the first and second transparent electrodes 130, 132. Each first or second transparent electrode 130, 132 can be 1,000 microns wide (and thus include 20 micro-wires 150 across its width) and separated from neighboring first or second transparent electrodes 130, 132 by a distance of 333.3 microns. Therefore, each first pad area 128 is 1,000 microns by 1,000 microns, each first interstitial area 12 is 333.3 microns by 1,000 microns and each second interstitial area 14 is 1,000 microns by 333.3 microns. If the electrodes on each first and second transparent substrate 122, 126 are aligned, this results in a first and second transparent substrate 122, 126 with a transparency of $\{(90\% \times 9)+(90\% \times 6)+(100\% \times 1)\}/16$ corresponding to the transparency of the first or second pad area 128, 129, the first or second interstitial area 12, 14, and the area with no electrodes and equal to 90.6%.

Presuming that each interstitial micro-wire 22 in the first or second interstitial areas 12, 14 is twice the height (and half the resistance) of the pad micro-wires 24 in the first or second pad areas 128, 129 of the corresponding first and second transparent electrodes 130, 132, then the conductivity of the first and second transparent electrodes 130, 132 is $(\{(3 \times 1)+(1 \times 0.5)\}/4$ or 0.875 for a reduction of 12.5% in resistance and a corresponding reduction in the RC time constant. The capacitance of the capacitors is unchanged.

Referring again to FIGS. 1A, 1B, and 3, in a further embodiment of the present invention, a transparent conductor apparatus 11 includes a first transparent substrate 122 having a first area 12 (e.g. interstitial area 12) and a second area 128 (e.g. pad area 128) different from the first interstitial area 12. A plurality of electrically connected first micro-wires 152 is formed on the first transparent substrate 122 in a first layer in the first area 12. A plurality of electrically connected second micro-wires 154 is formed on the first transparent substrate 122 in the first layer in the second area 128 and the electrically connected second micro-wires 154 are electrically connected to the first micro-wires 152. The height of at least a portion of the first micro-wires 152 in the first area 12 is greater than the height of at least a portion of the second micro-wires 154 in the second area 128.

FIG. 4A is a cross section of the structures shown in FIGS. 1A, 1B, and 3 corresponding to the cross section line A of FIG. 2B. In this embodiment of the present invention, a touch-responsive capacitor apparatus 10 includes a first transparent substrate 122 on which is formed first transparent electrodes 130 and a second transparent substrate 126 on which is formed second transparent electrodes 132 orthogonal to the first transparent electrodes 130. The first and second transparent electrodes 130, 132 both include relatively tall interstitial micro-wires 22 and relatively short pad micro-wires 24. The first and second transparent electrodes 130, 132 face each other from opposite sides of a dielectric layer 124. A plurality of spaced-apart first and second pad areas 128 and 129 whose capacitance changes in response to a touch is formed where the first and second transparent electrodes 130, 132 are adjacent or overlap. A plurality of spaced-apart first interstitial areas 12 is formed on the first transparent substrate 122 in the first transparent electrode 130. A plurality of spaced-apart second interstitial areas 14 is formed on the second transparent substrate 126 in the second transparent electrode 132 spaced apart from the second pad areas 129. The second interstitial areas 14 are not shown in FIG. 4A since they are located out of the plane on which FIG. 4A is drawn. See the top view of FIG. 2 or the perspective of FIG. 1.

Figure 4B:
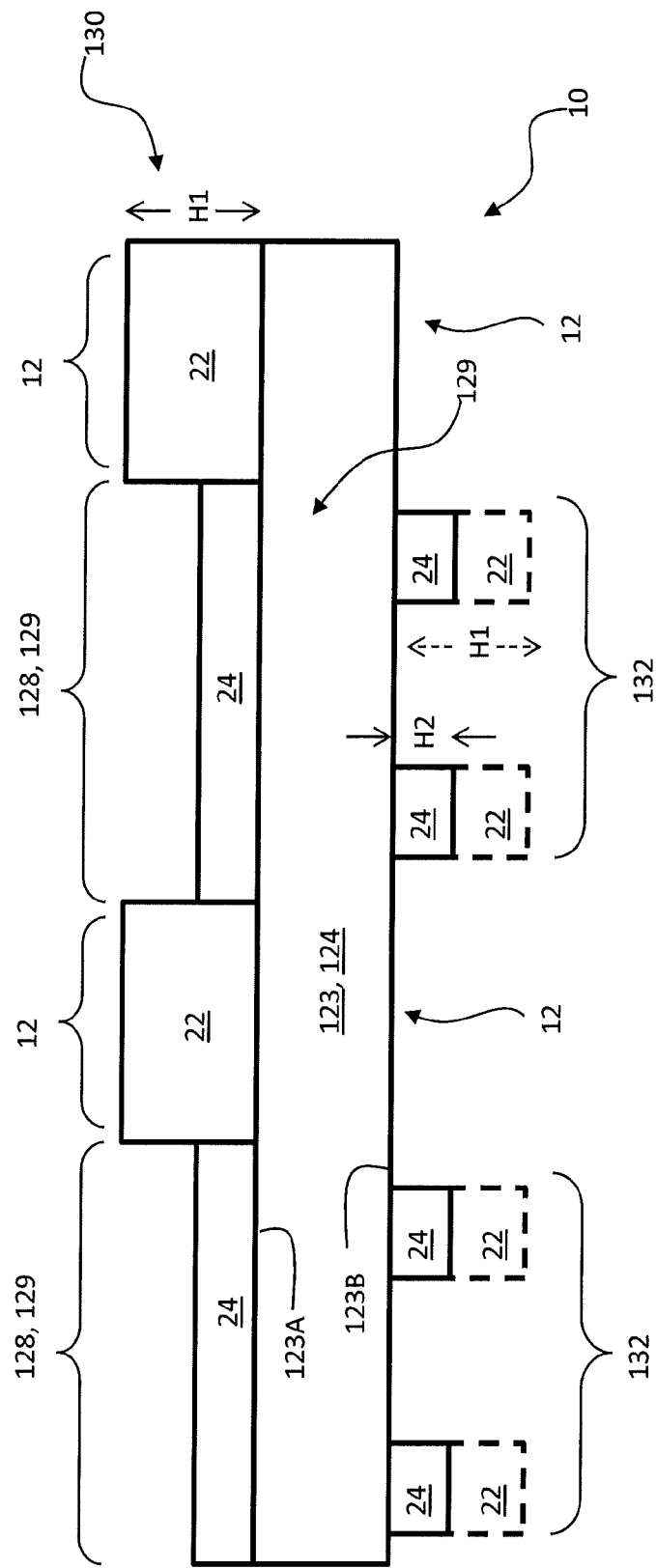

Referring to FIG. 4B in an alternative embodiment of the present invention, a touch-responsive capacitor apparatus 10 includes a transparent substrate 123 having first and second sides 123A, 123B, respectively. A first transparent electrode 130 is formed on or over the first side 123A of the transparent substrate 123 and includes relatively short pad micro-wires 24 and relatively tall interstitial micro-wires 22 formed in a first layer. A second orthogonal transparent electrode 132 is formed on or under the second side 123B of the transparent substrate 123 and also includes relatively short pad micro-wires 24 and relatively tall interstitial micro-wires 22 formed in a second layer different from the first layer. In this embodiment, transparent substrate 123 also serves the function of dielectric layer 124. A plurality of spaced-apart first and second pad areas 128, 129 pairs is formed that define capacitors whose capacitance changes in response to a touch. (In FIGS. 4A and 4B, the first pad areas 128 are at a different depth from the second pad areas 129 and are not separately illustrated.) A plurality of spaced-apart first interstitial areas 12 is formed over the first side 123A of the transparent substrate 123 and spaced apart from the first pad areas 128. A plurality of spaced-apart second interstitial areas 14 is formed under the second side 123B of the transparent substrate 123 and spaced apart from the second pad areas 129 and from the first interstitial areas 12 (in an orthogonal dimension). The second interstitial areas 14 are not indicated in FIG. 4B since they are located out of the plane on which FIG. 4B is drawn. See the top view of FIG. 2 or the perspective of FIG. 1.

A first plurality of interstitial micro-wires 22 are formed over the first side 123A of the dielectric substrate layer 124 in a first layer in the first interstitial areas 12. A first plurality of pad micro-wires 24 is formed over the first side 123A of the transparent substrate 123 in the first layer in the first pad areas 128 and the pad micro-wires 24 are electrically connected to the interstitial micro-wires 22. A second plurality of interstitial micro-wires 22 are formed under the second side 123B of the transparent substrate 123 in the second interstitial areas 14 in a second layer different from the first layer. A second plurality of pad micro-wires 24 are formed on or under the second side 123B of the transparent substrate 123 in the second layer in the first pad areas 128 and are electrically connected to the second plurality of interstitial micro-wires 22. (The pad and interstitial micro-wires 24, 22 and the second interstitial areas 14 are not indicated in FIG. 4A or 4B but are shown in FIG. 3.) A dielectric layer 124 is located between the first and second pluralities of micro-wires 150. In an embodiment, the dielectric layer 124 provides the transparent substrate 123. Alternatively, the dielectric layer 124 is a layer separate from the transparent substrate 123. The height of at least a portion of the interstitial micro-wires 22 in the first interstitial area 12 is greater than the height of at least a portion of the pad micro-wires 24 in the first pad area 128 over the first side 123A and the height of at least a portion of the interstitial micro-wire 22 in the second interstitial area 14 is greater than the height of at least a portion of the pad micro-wires 24 in the first pad area 128 under the second side 123B.

In a further embodiment of the present invention, pad and interstitial micro-wires 24, 22 forming first or second transparent electrodes 130, 132 having first or second pad areas 128, 129 and first or second interstitial areas 12, 14 are located on either side of a dielectric layer 124. Thus, the dielectric layer 124 has a first side 123A and a second side 123B opposite the first side. The first side 123A is adjacent the first layer and the second layer is formed under the second side 123B of the dielectric layer 124.

In a further embodiment of the present invention and as illustrated in FIGS. 1A, 1B, 2A, 2B, and 3, a first plurality of the interstitial and pad micro-wires 22, 24 form an array of first separated transparent electrodes 130 arranged in a first direction and a second plurality of the interstitial and pad micro-wires 22, 24 form an array of second separated transparent electrodes 132 arranged in a second direction different from the first direction, for example an orthogonal direction. The first transparent electrodes 130 can overlap or be adjacent to the second transparent electrodes 132 in the first or second pad areas 128, 129. Likewise, the first transparent electrodes 130 can overlap or be adjacent to the second transparent electrodes 132 in the first or second interstitial areas 12, 14.

Figure 5C:
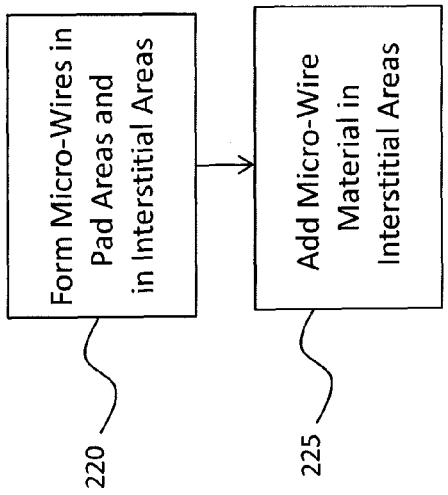
FIGS. 5A-5C are flow diagrams illustrating various methods of various embodiments of the present invention.
Figure 5A:
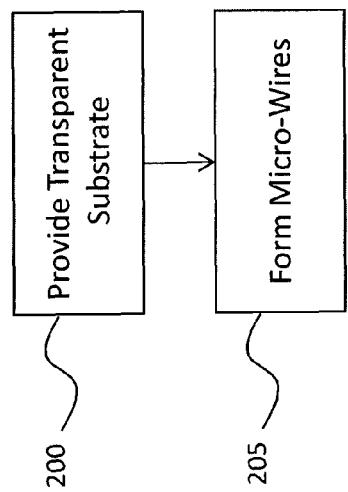

There are various methods of the present invention that can be employed to construct the various embodiments of the present invention. Referring to FIG. 5A, a method of making a transparent touch-responsive capacitor apparatus 10 includes providing a transparent substrate (e.g. 122, 123, 126) and defining a plurality of first pad areas 128 and first interstitial areas 12 in a first micro-wire layer and defining a plurality of second pad areas 129 and second interstitial areas 14 in a second micro-wire layer, pairs of first and second pad areas 128, 129 defining corresponding touch-responsive capacitors, the first and second micro-wire layers supported by the transparent substrate in step 200.

In step 205, a plurality of electrically connected first pad micro-wires 24 are formed in the first pad areas 128 in the first micro-wire layer and a plurality of electrically connected first interstitial micro-wires 22 are formed in the first interstitial areas 12 in the first micro-wire layer, the first pad micro-wires 24 electrically connected to the first interstitial micro-wires 22. A plurality of electrically connected second pad micro-wires 24 are formed in the second pad areas 129 in the second micro-wire layer and a plurality of electrically connected second interstitial micro-wires 22 are formed in the second interstitial areas 14 in the second micro-wire layer, the second pad micro-wires 24 electrically connected to the second interstitial micro-wires 22. The height of at least a portion of the first interstitial micro-wires 22 is greater than the height of at least a portion of the first pad micro-wires 24.

While the present invention in this embodiment is described in terms of first or second pad areas 128, 129 or first or second interstitial areas 12, 14, in other embodiments the areas are simply and generally considered as first interstitial areas 12 and second pad areas 129, wherein one of the areas, for example the first area 12 or 14, includes micro-wires 150 that have a height greater than micro-wires 150 in the second area, for example 128 or 129.

There are several different ways in which the micro-wires 150 can be formed according to various methods of the present invention. In one embodiment, the pad micro-wires 24 in the first or second pad areas 128, 129 are made at the same time and with the same processing step as the interstitial micro-wires 22 in the first or second interstitial areas 12, 14. In another embodiment, the pad micro-wires 24 in the first or second pad areas 128, 129 are made in a different processing step from the interstitial micro-wires 22 in the first or second interstitial areas 12, 14. In the latter case, referring to FIG. 5B, the pad micro-wires 24 in the first or second pad areas 128, 129 are made in step 210 separately from the interstitial micro-wires 22 in the first or second interstitial areas 12, 14 in step 215. Alternatively, referring to FIG. 5C, the pad micro-wires 24 in the first or second pad areas 128, 129 are made at the same times as a portion or first layer of the interstitial micro-wires 22 in the first or second interstitial areas 12, 14 in step 220. In a separate step 225, micro-wire material can be added to the material in the first or second interstitial areas 12, 14.

Figure 6B:
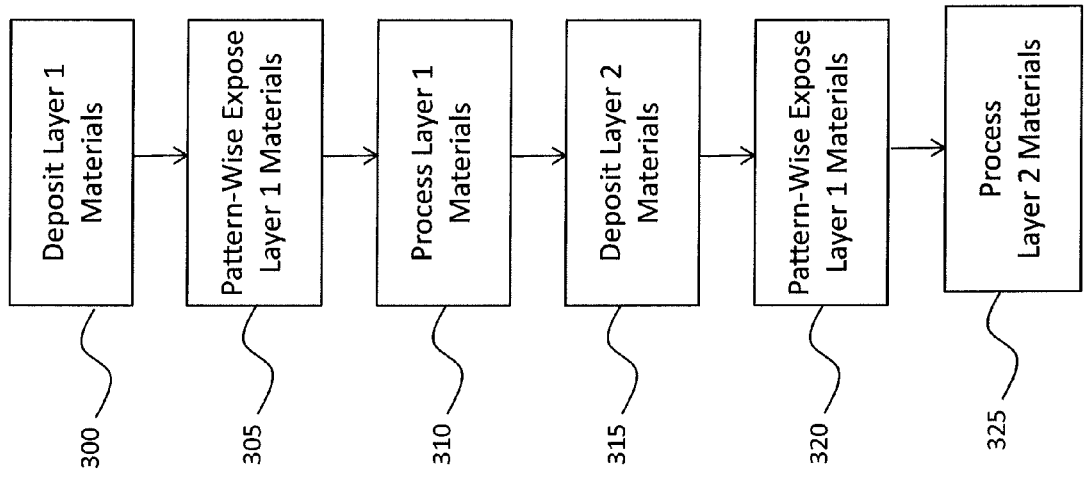
FIGS. 6A-6B are flow diagrams illustrating various methods of various embodiments of the present invention.
Figure 6A:
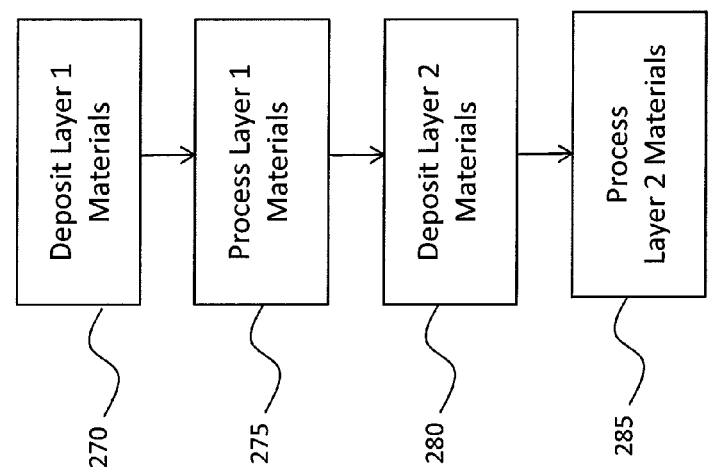

In other embodiments of the present invention, the different micro-wires 150 can be made by depositing unpatterned layers of material and then differentially processing the layers to form the different micro-wire structures. For example, a first layer of curable material can be coated over the transparent substrate (e.g. 122, 123, 126), pattern-wise cured in a first pattern and then a second layer of curable material coated over the transparent substrate (e.g. 122, 123, 126) and first patterned material. The second layer of curable material is then pattern-wise cured in a second pattern different from the first pattern. Referring to FIG. 6A, a first layer of materials can be deposited on a transparent substrate (e.g. 122, 123, 126) in step 270 and then processed in step 275. A second layer of materials can be deposited on a transparent substrate (e.g. 122, 123, 126) in step 280 and then processed in step 285. A variety of processing methods can be used, for example photo-lithographic methods. For example, the materials can be differentially pattern-wise exposed. Referring to FIG. 6B, a first layer of materials can be deposited on a transparent substrate (e.g. 122, 123, 126) in step 300, pattern-wise exposed in step 305, and then processed in step 310. A second layer of materials can be deposited on a transparent substrate in step 315, pattern-wise exposed with a different pattern in step 320, and then processed in step 325.

Figure 5B:
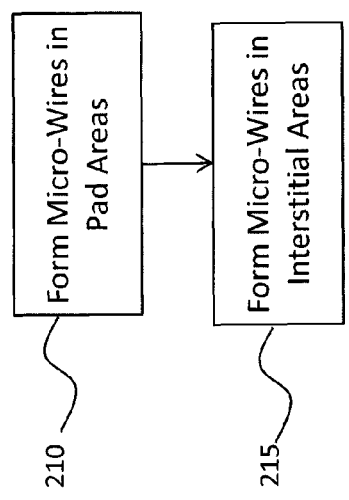

In any of these cases, the pad micro-wires 24 in the first or second pad areas 128, 129 can be made before or after the interstitial micro-wires 22 in the first or second interstitial areas 12, 14 on any of the transparent substrates (e.g. in FIG. 5B). A portion of the interstitial micro-wires 22 in the first or second interstitial areas 12, 14 can be made before or after the pad micro-wires 24 in the first or second pad areas 128, 129 and first or second interstitial areas 12, 14 (e.g. FIG. 5C).

Thus, in another embodiment of the present invention illustrated in FIGS. 6A and 6B, a method of making a transparent touch-responsive capacitor apparatus 10 includes providing a first transparent substrate 122; defining a plurality of first and second spaced-apart pad areas 128, 129 over the first transparent substrate 122, pairs of first and second pad areas 128, 129 defining corresponding touch-responsive capacitors, and defining a plurality of first interstitial areas 12 spaced apart from the first pad areas 128 and a plurality of second interstitial areas 14 spaced apart from the second pad areas 129; forming a first material layer over the first transparent substrate 122; forming a second material layer over the first material layer; forming a plurality of electrically connected interstitial micro-wires 22 over the first transparent substrate 122 in the first and second materials layers; forming a plurality of electrically connected pad micro-wires 24 over the first transparent substrate 122 in the first material layer, the interstitial micro-wires 22 electrically connected to the pad micro-wires 24; and wherein the height of at least a portion of the interstitial micro-wires 22 is greater than the height of at least a portion of the pad micro-wires 24.

Figure 7B:
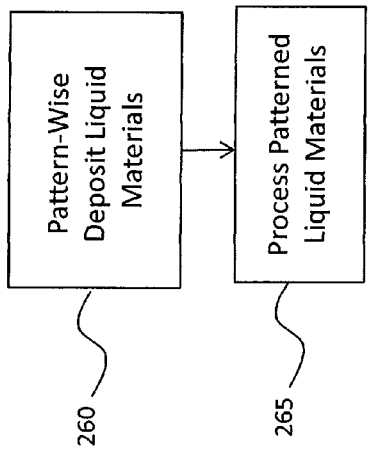
FIGS. 7A-7B are flow diagrams illustrating various methods of various embodiments of the present invention.
Figure 7A:
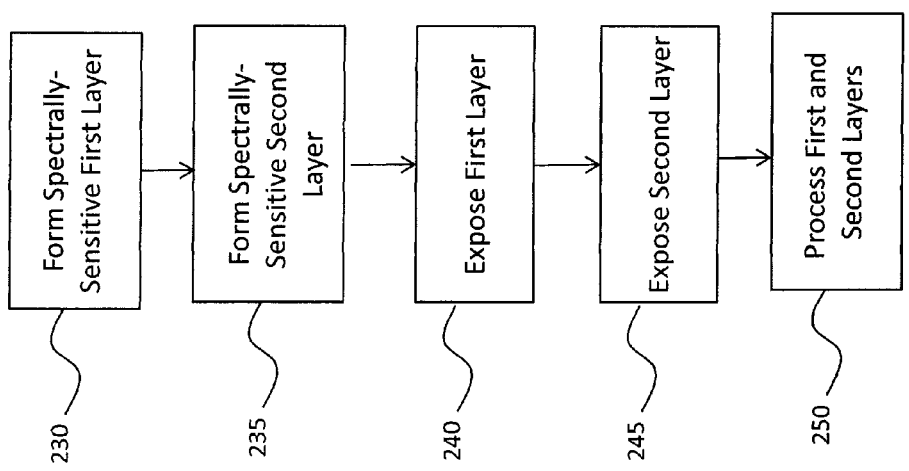

In a further embodiment of the present invention, referring to FIG. 7A, first and second precursor layers of spectrally photo-sensitive precursor materials on the transparent substrate are formed in steps 230 and 235. The first layer is sensitive to a first spectrum and the second layer is sensitive to a second spectrum different from the first spectrum. In certain embodiments, however, the first and second layers are sensitive to light of a common wavelength. For example, the first layer is sensitive to ultraviolet and red light whereas the second layer is sensitive only to ultraviolet. The first and second layers are both part of the common plane in which the micro-wires 150 are located when formed. The photo-sensitive pre-cursor materials in the first interstitial area 12 are pattern-wise exposed to first-spectrum light and, optionally, to second-spectrum light in the first step 240 to expose both the first and second precursor layers. The pattern defines the plurality of electrically connected first micro-wires 152. The photo-sensitive precursor materials in the pad area are pattern-wise exposed to second-spectrum light in the second step 245 to expose only one of the precursor layers. Any of the exposures can be done in any order or at the same time as other exposures. The pattern defines the plurality of electrically connected second micro-wires 154. The photo-sensitive precursor materials in both layers in the pad and the first interstitial areas 12 are processed in step 250 to form the one or more electrically conductive micro-wires 150.

A variety of materials can be employed to form the first and second patterned layers, including resins that can be cured by cross-linking wave-length-sensitive polymeric binders and silver halide materials that are exposed to light. Processing can include both washing out residual uncured materials and curing or exposure steps.

Figure 8:
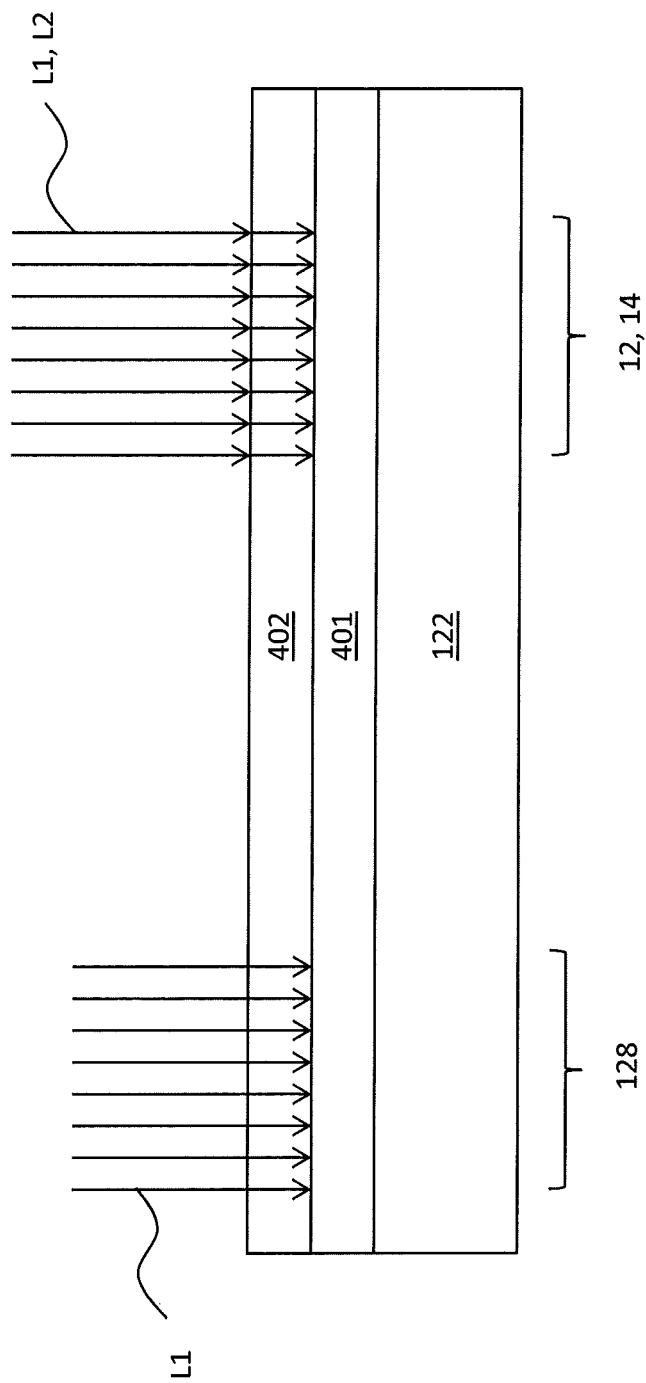
FIG. 8 is a schematic cross section of a two-layer structure useful in understanding a method of the present invention.

In order to enhance the sensitivity of the first and second precursor layers to the first and second spectra, in another embodiment of the present invention, the first layer includes a first spectrally-sensitive radiation-absorbing material and the second layer includes a second spectrally-sensitive radiation-absorbing material different from the first spectrally-sensitive radiation-absorbing material. For example, the spectrally-sensitive radiation-absorbing materials can be dyes that preferentially absorb radiation used to pattern-wise expose the materials. Referring to FIG. 8, a first layer 401 of a first spectrally photo-sensitive precursor material and a second layer 402 of a second different spectrally photo-sensitive precursor material are coated on a first transparent substrate 122. Light L1 of a first spectrum passes through the second layer 402 and selectively exposes the first layer 401 with a first pattern, for example corresponding to the pattern of the pad micro-wires 24 in the first or second pad areas 128, 129 and corresponding to the pattern of the interstitial micro-wires 22 in the first or second interstitial areas 12, 14. Light L2 of a second spectrum exposes at least the second layer 402 (and optionally the first layer 401) and with a second pattern, for example corresponding to the pattern of the interstitial micro-wires 22 in the first or second interstitial areas 12, 14. Thus, the photo-sensitive precursor material in the first layer 401 forms micro-wires 150 in the first or second pad 128, 129 and first or second interstitial areas 12, 14 while the photo-sensitive precursor material in the second layer 402 adds additional material to the micro-wires 150 in the first or second interstitial areas 12, 14 (for example as illustrated in FIGS. 5C and 7A). In a processing step, the exposed first and second layers can be developed (e.g. cross-linked) and unexposed materials removed to form the one or more micro-wires 150.

In an embodiment, the first and second precursor layers include conductive inks, conductive particles, or metal ink. The exposed portions of the first and second layers are cured to form the micro-wires 150 (for example by exposure to patterned laser light to cross-link a curable resin) and the uncured portions removed. Alternatively, unexposed portions of the first and second layers are cured to form the micro-wires 150 and the cured portions removed.

In another embodiment of the present invention, the first and second precursor layers are silver salt layers. The silver salt can be any material that is capable of providing a latent image (that is, a germ or nucleus of metal in each exposed grain of metal salt) according to a desired pattern upon photo-exposure. The latent image can then be developed into a metal image.

For example, the silver salt can be a photosensitive silver salt such as a silver halide or mixture of silver halides. The silver halide can be, for example, silver chloride, silver bromide, silver chlorobromide, or silver bromoiodide.

Generally, the silver salt layer includes one or more hydrophilic binders or colloids. Non-limiting examples of such hydrophilic binders or colloids include but are not limited to hydrophilic colloids such as gelatin or gelatin derivatives, polyvinyl alcohol (PVA), polyvinylpyrrolidone (PVP), casein, and mixtures thereof.

In many embodiments, the binder in the silver salt layer (or any other layer) includes one or more hardeners designed to harden the particular binder such as gelatin. Particularly useful hardeners include, but are not limited to, non-polymeric vinyl-sulfones such as bis(vinyl-sulfonyl) methane (BVSM), bis(vinyl-sulfonyl methyl)ether (BVSME), and 1,2-bis(vinyl-sulfonyl acetoamide)ethane (BVSAE). Mixtures of hardeners can be used if desired.

One useful photosensitive silver salt composition is a high metal (for example, silver)/low binder (for example, gelatin) composition, that after silver salt development, is sufficiently conductive. Where the photosensitive silver salt layer includes an emulsion of silver halide dispersed in gelatin, a particularly useful weight ratio of silver to gelatin is 1.5:1 or higher in the silver salt layer. In certain embodiments, a ratio between 2:1 and 3:1 in the silver salt layer is particularly useful.

According to many embodiments, the useful silver salt is a silver halide (AgX) that is sensitized to any suitable wavelength of exposing radiation. Organic sensitizing dyes can be used to sensitize the silver salt to visible or IR radiation, but it can be advantageous to sensitize the silver salt in the UV portion of the electromagnetic spectrum without using sensitizing dyes.

Processing of AgX materials to form conductive traces typically involves at least developing exposed AgX and fixing (removing) unexposed AgX. Other steps can be employed to enhance conductivity, such as thermal treatments, electroless plating, physical development and various conductivity enhancing baths, e.g., as described in U.S. Pat. No. 3,223,525.

In an embodiment, a method of making a transparent conductor structure useful for touch screen and other electronic devices includes providing a transparent conductor precursor structure. The transparent conductor precursor structure includes a transparent substrate (e.g. 122, 123, 126), a first precursor material layer formed over the transparent substrate (e.g. 122, 123, 126) and a second precursor material layer formed on the first precursor material layer. A plurality of electrically connected first micro-wires 152 is formed in the first and second precursor material layers within a first transparent conductor area. That is, the conductive first micro-wire 152 spans at least a portion of both the first and second precursor material layers.

A plurality of electrically connected second micro-wires 154 are formed in either the first precursor material layer or the second precursor material layer within a second transparent conductor area, the second micro-wires 154 electrically connected to the first micro-wires 152. When the second micro-wires 154 are formed in the first precursor material layer, some portion of a second micro-wire 154 can be formed in the second precursor material layer as well, but in a lesser amount than in the first precursor material layer. In a useful embodiment, substantially no portion of the second micro-wire 154 is formed in the second precursor material layer. Similarly, when the second micro-wires 154 are formed in the second precursor material layer, some smaller portion of a second micro-wire 154 can be formed in the first precursor material layer. It can be particularly useful if there is substantially no portion of the second micro-wire 154 formed in the first precursor material layer.

The height of at least a portion of the first micro-wires 152 is greater than the height of at least a portion of the second micro-wires 154 and to achieve transparency, the total area occupied by the first micro-wires 152 is less than 15% of the first transparent conductor area and the total area occupied by the second micro-wires 154 is less than 15% of the second transparent conductor area. The transparent conductive structure can include a plurality of first and second transparent conductor areas.

As in embodiments described above, the first precursor material layer can be photosensitive to a first-spectrum light and the second precursor material layer is photosensitive to a second-spectrum light different from the first spectrum light. In some embodiments, the first precursor material layer is also photosensitive to the second-spectrum light and the second precursor material layer is substantially insensitive to first-spectrum light.

In an embodiment, the transparent precursor material layer is pattern-wise exposed in the first transparent conductor area to second-spectrum light, and optionally to first-spectrum light, defining the plurality of electrically connected first micro-wires 152. The transparent precursor material layer is also pattern-wise exposed in the second transparent conductor area to first-spectrum light defining the plurality of electrically connected second micro-wires 154. After exposure, the precursor material layer is processed to form the first and second micro-wires 152, 154. In a particularly useful embodiment, the first and second precursor material layers each include a photosensitive precursor material, e.g., silver halide, provided in a binder material, such as gelatin.

In an embodiment, the transparent precursor material layer is pattern-wise exposed in the first transparent conductor area to first-spectrum light and second-spectrum light, defining the plurality of electrically connected first micro-wires 152. The transparent precursor material layer is pattern-wise exposed in the second transparent conductor area to first- or second-spectrum light defining the plurality of electrically connected second micro-wires 154. If formation of the second micro-wires 154 is desired primarily in the first precursor material layer, first-spectrum light is used. Alternatively, if formation of the second micro-wires 154 is desired primarily in the second precursor material layer, second-spectrum light is used. After exposure, the transparent precursor material layer is processed to form the first and second micro-wires 152, 154. In a particularly useful embodiment, the first and second precursor material layers each include a photosensitive precursor material, e.g., silver halide, provided in a binder material, such as gelatin.

In an embodiment, the first and second precursor material layers can each include a metallic particulate material or a metallic precursor material, and a photosensitive binder material.

As noted above with reference to FIG. 5B, in an embodiment the one or more pad micro-wires 24 in the first (or second) pad areas 128 (129) are formed in the first step and the one or more interstitial micro-wires 22 in the first or second interstitial areas 12, 14 are formed in the second step. For example, referring to FIG. 7B, first precursor material is deposited in the first (or second) pad areas 128 (129) in step 260 and pattern-wise processed in step 265. Second precursor material is deposited in the first (or second) interstitial area 12 (14) and pattern-wise processed. The first and second precursor materials can be liquid (for example a conductive, curable ink) and can be blanket coated in one step and pattern-wise cured by pattern-wise exposing the blanket coating in the first or second pad 128, 129 and first or second interstitial areas 12, 14. In the second step, the first transparent substrate 122 is blanket coated a second time and pattern-wise cured in only the first or second interstitial areas 12, 14 (corresponding to the process illustrated in FIG. 5C).

In an alternative embodiment, first precursor material is pattern-wise deposited and cured in the first (or second) pad areas 128, (129) and second precursor material is pattern-wise deposited and cured in the first (or second) interstitial area 12 (14) (e.g. corresponding to the process illustrated in FIG. 5B). Thus, the one or more pad micro-wires 24 are formed in the first (or second) pad areas 128 (129) and a portion of each of the one or more interstitial micro-wires 22 in the first (or second) interstitial areas 12 (14) in a first step and the remainder of the one or more interstitial micro-wires 22 in the first (or second) interstitial areas 12 (14) is formed in a second step after the first step. The first precursor material is deposited in the first (or second) pad areas 128 (129) and the first (or second) interstitial areas 12 (14) and pattern-wise processed and second precursor material is deposited in the first (or second) interstitial areas 12 (14) and pattern-wise processed to form the interstitial micro-wires 22. The deposition can include blanket-coating the transparent substrate and pattern-wise exposing the blanket coating. Blanket coating methods are known in the art, for example by spin coating or curtain coating.

In another embodiment, the deposition and curing are different in the second step to provide interstitial micro-wires 22 having a greater height in the first or second interstitial areas 12, 14 compared to the pad micro-wires 24 in the first (or second) pad areas 128 (129). Different materials can be used in the second step than in the first step.

In yet another embodiment, first precursor material can be pattern-wise deposited in the first (or second) pad areas 128 (129) and the first (or second) interstitial areas 12 (14). Second precursor material is pattern-wise deposited in the first (or second) interstitial areas 12 (14). The first precursor material can be pattern-wise deposited before the second precursor material or the second precursor material can be pattern-wise deposited before the first precursor material. The deposited materials can be processed or cured after each deposition or the deposited materials can be processed or cured at one time after they have been pattern-wise deposited. Pattern-wise deposition methods are known in the art, for example by inkjet printing, as are curable precursor materials, for example silver inks.

In another embodiment of the present invention, the steps include the pattern-wise transfer of precursor material from a source to the transparent substrate.

In another embodiment of the present invention, precursor materials are deposited in a layer, for example in a step, and then pattern-wise defined in one or more steps. In such a method, a transparent substrate (e.g. 122, 123, 126) is provided. A plurality of first and second spaced-apart first and second pad areas 128, 129 is defined over the first transparent substrate 122, pairs of first and second pad areas 128, 129 defining corresponding touch-responsive capacitors. A plurality of first interstitial areas 12 spaced apart from the first pad areas 128 and a plurality of second interstitial areas 14 spaced apart from the second pad areas 129 are defined. A precursor material layer is formed over the first transparent substrate 122. A plurality of electrically connected interstitial micro-wires 22 is pattern-wise defined over the first transparent substrate 122 in the material layer in the first interstitial areas 12. A plurality of electrically connected pad micro-wires 24 is pattern-wise defined over the first transparent substrate 122 in the material layer in the first pad areas 128. The interstitial micro-wires 22 are electrically connected to the pad micro-wires 24 in the same micro-wire layer. The height of at least a portion of the interstitial micro-wires 22 is greater than the height of at least a portion of the pad micro-wires 24.

Figure 9:
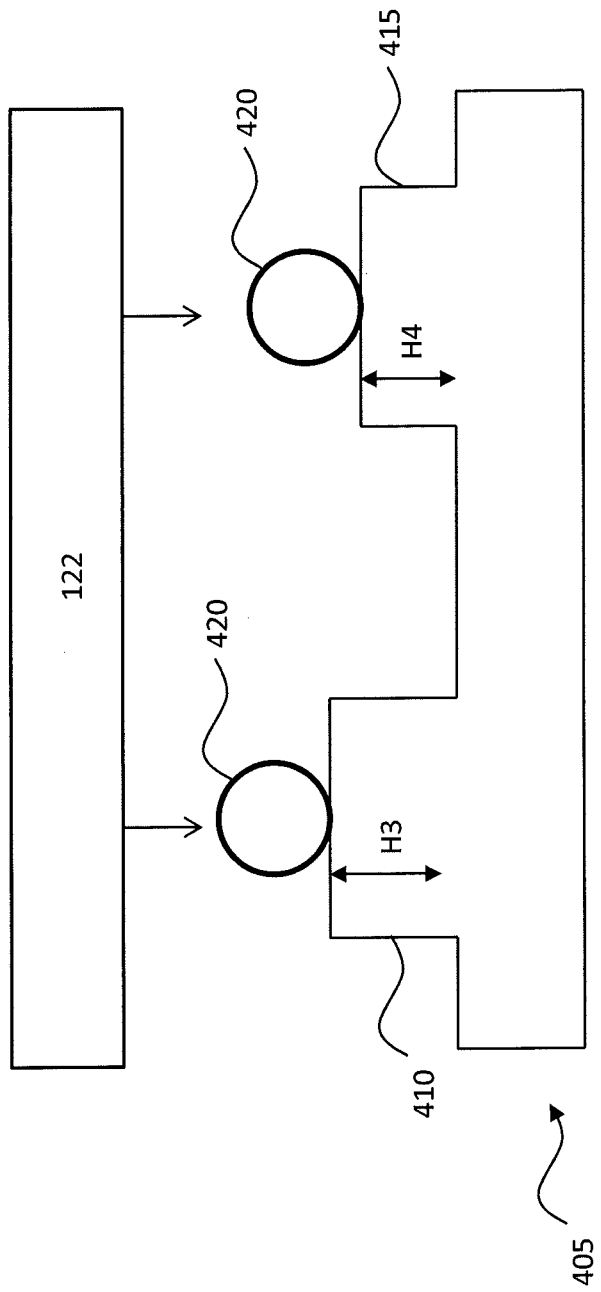
FIG. 9 is a schematic cross section of a printing plate useful in understanding a method of the present invention.
Figure 10:
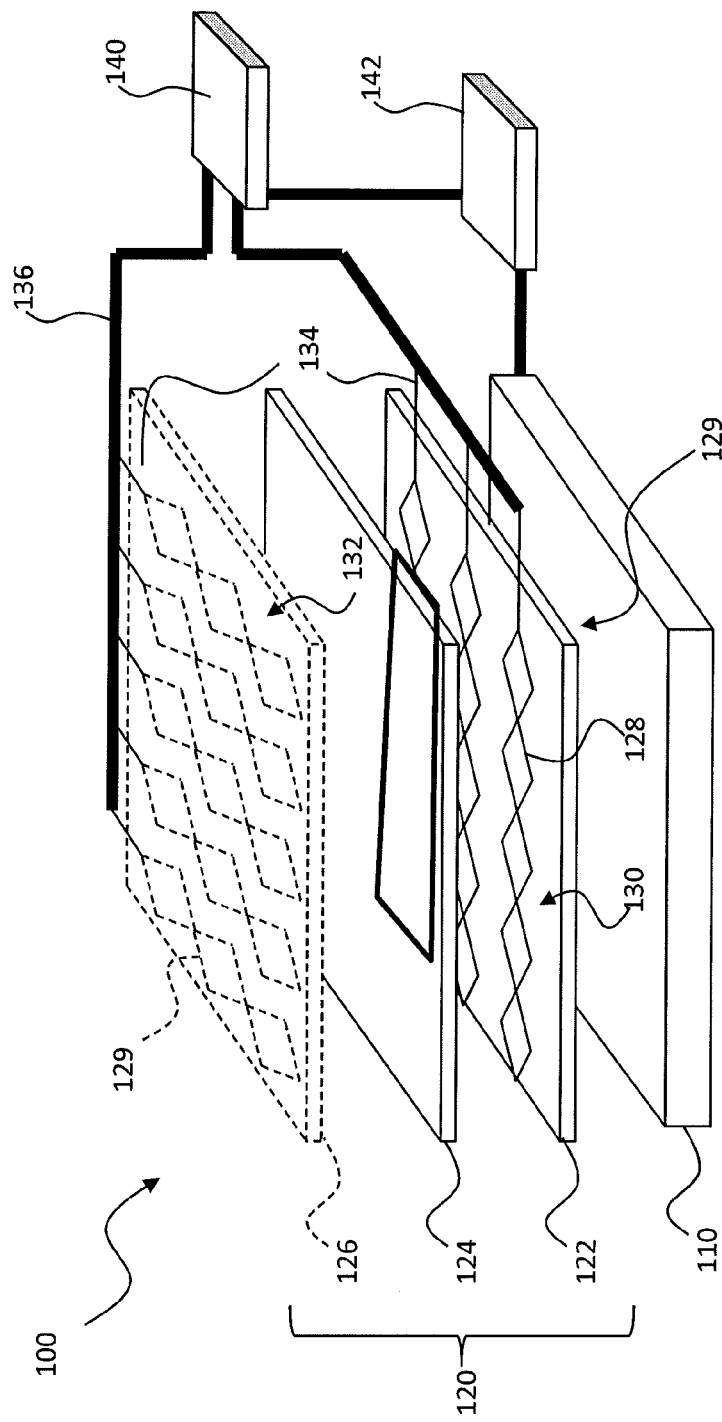
FIG. 10 is a prior-art exploded perspective illustrating a mutual capacitive touch screen having adjacent pad areas in conjunction with a display and controllers.

Referring to FIG. 9, in an embodiment of the present invention, a printing plate 405 is provided. The printing plate has first and second flexible raised areas 410, 415, the first raised areas 410 having a different height H3 above the printing plate 405 than the height H4 of the second raised areas 415. A flexible raised area is one which can be compressed when brought into contact with a rigid surface. A material 420 is deposited on each of the first and second raised areas 410, 415 on the printing plate 405. A first transparent substrate 122 is located in contact with the first and second raised areas 410, 415 to differentially transfer different amounts of material 420 from the first raised and second raised areas 410, 415 on to the first transparent substrate 122. Because the first and second raised areas 410, 415 are flexible, the higher raised area is compressed by the first transparent substrate 122 so that the first transparent substrate 122 surface is brought into contact with the material 420 on both of the first and second raised areas 410, 415. The material 420 is then transferred from the first raised areas 410 to define the plurality of electrically connected first micro-wires 152 and the material 420 is transferred from the second raised areas 415 to define the plurality of electrically connected second micro-wires 154. The transferred material 420 is then processed as needed to form the first and second micro-wires 152, 154. The amount of material 420 transferred from the first and second raised areas 410, 415 to the first transparent substrate 122 depends on a variety of factors, including the viscosity of the material 420, the relative height of the raised areas, the distance the first raised area 410 is apart from the second raised area 415, and the temperatures of the material 420, the first and second raised areas 410, 415, or the first transparent substrate 122. Flexographic printing plates having flexible raised areas are known in the art.

In a further embodiment of the present invention, a photo-sensitive precursor material 420 is coated on the transparent substrate (e.g. 122, 123, 126) and pattern-wise first exposed in the first interstitial area 12 to define the plurality of electrically connected first micro-wires 152. The photo-sensitive precursor material in the pad area is pattern-wise second exposed to define the plurality of electrically connected second micro-wires 154. The second exposure is different from the first exposure. The photo-sensitive precursor material 420 is processed in both the first pad area 128 and the interstitial areas 12 to form the one or more electrically conductive micro-wires 150.

In various embodiments, the photo-sensitive precursor material 420 is responsive to two different spectral wavelengths, the first exposure is done at the same time as the second exposure, or the first exposure is done at a different time than the second exposure. The second exposure can be longer, hotter, or of a different frequency than the first exposure.

In any of these cases, the precursor material 420 is electrically conductive after it is cured and any needed processing completed. Before patterning or before curing, the precursor material 420 is not necessarily electrically conductive. As used herein, precursor material 420 is material that is electrically conductive after any final processing is completed and the precursor material 420 is not necessarily conductive at any other point in the micro-wire formation process.

Figure 14:
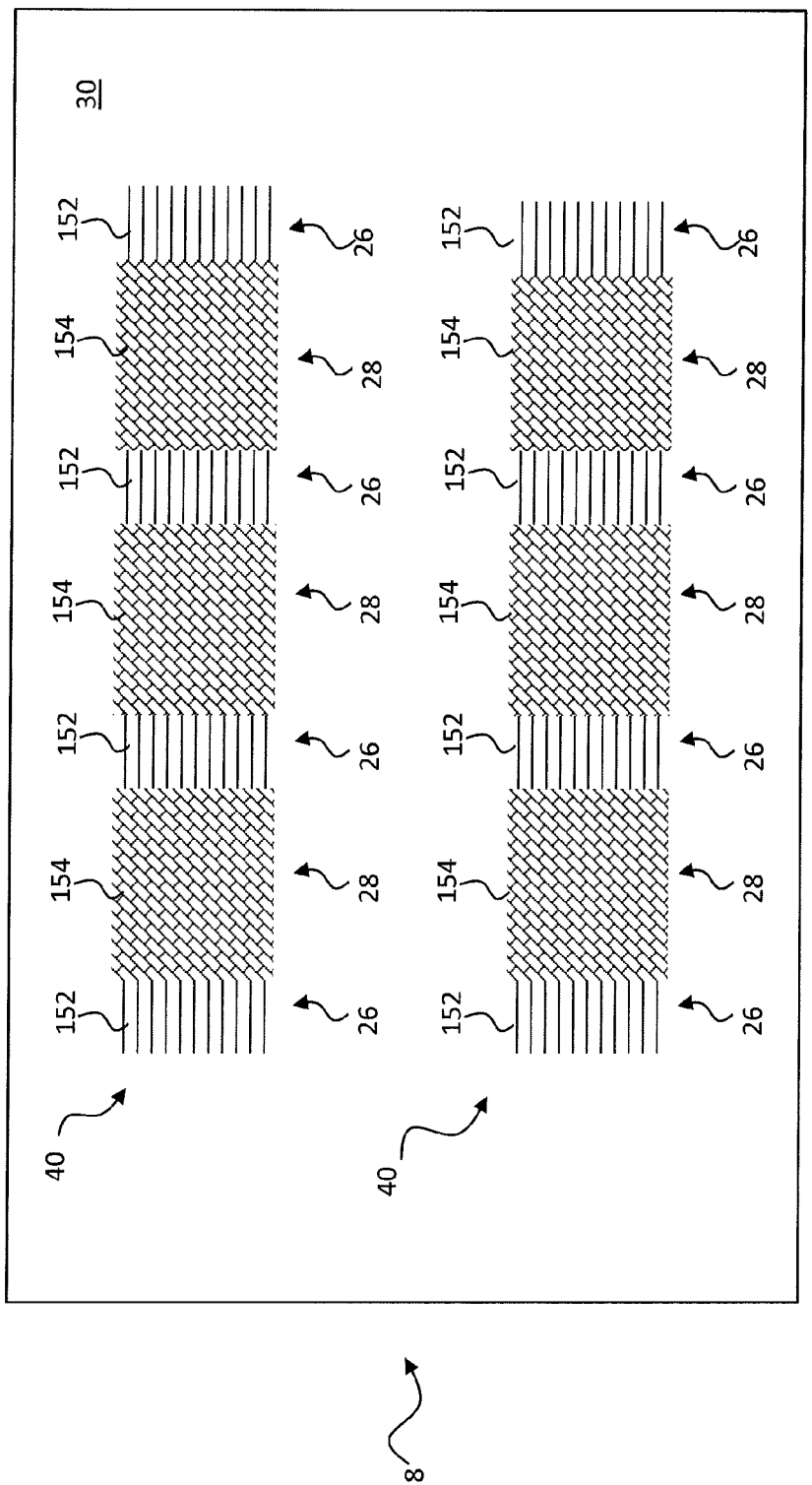
FIG. 14 is a top-view schematic of an electronic device having transparent conductor areas according to an embodiment of the present invention.

Referring to FIG. 14 in a further embodiment of the present invention, an electronic device 8 includes a support 30 having greater than 80% transmittance to light at 550 nm and a transparent conductor area 40 provided over at least a portion of one side of the support 30. The support 30 can be a transparent substrate, for example similar to transparent substrate 122, 126, or 123 (FIG. 1A, 4B). The transparent conductor area can be, for example a transparent electrode such as first transparent electrodes 130 or second transparent electrodes 132 (FIG. 1A, 2A, 2B).

Figure 15:
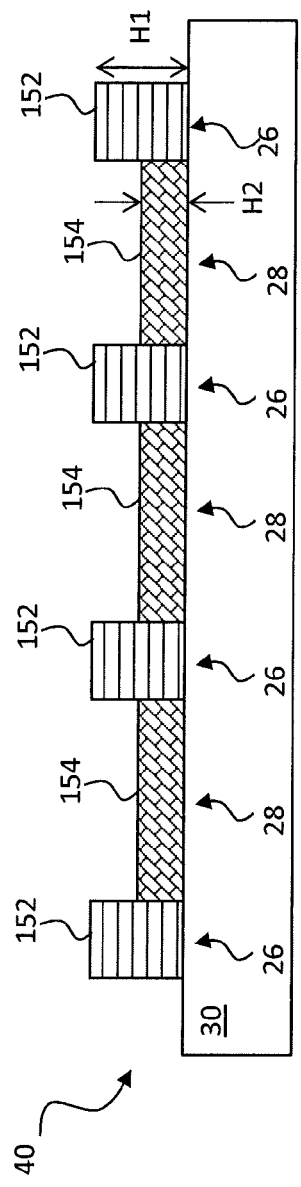
FIG. 15 is a cross-section schematic of an electronic device having transparent conductor areas according to an embodiment of the present invention.

Referring also to FIG. 15, the transparent conductor area 40 includes first conductive metallic micro-wires 152 provided in first locations 26 in a first micro-pattern, the first conductive metallic micro-wires 152 having a width in a range from 0.5 um to 20 um and a first height H1. Second conductive metallic micro-wires 154 are provided in second locations 28 different from the first locations 26 in a second micro-pattern. The second conductive metallic micro-wires 154 have a second height H2 that is less than the first height H1 and a width in a range from 0.5 um to 20 um. The first and second metallic micro-wires 152, 154 can correspond to the interstitial micro-wires 22 and the pad micro-wires 24, respectively.

The first and second metallic micro-wires 152, 154 occupy an area less than 15% of the transparent conductor area 40.

Figure 16:
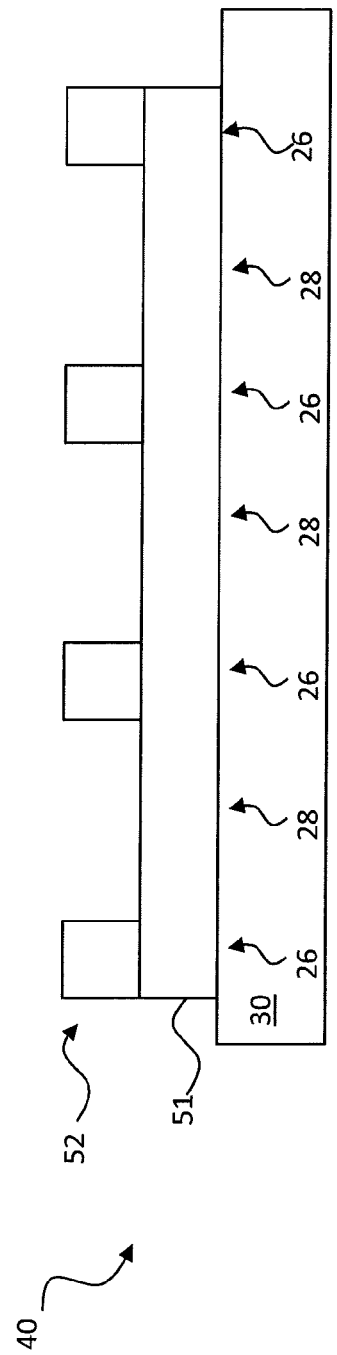
FIG. 16 is a cross-section schematic of an electronic device having multiple layers according to an embodiment of the present invention.

Referring to FIG. 16 in an embodiment of the present invention, the transparent conductor layer 40 includes at least first and second layers 51, 52. The first metallic micro-wires 152 (not shown in FIG. 16) are formed in the first layer 51 and the second metallic micro-wires 154 (not shown in FIG. 16) are formed in both the first and second layers 51, 52. In a further embodiment, the first metallic micro-wires 152 have a metallic bi-layer structure, for example including a first layer 51 and a second layer 52 formed on the support 30, as illustrated in FIG. 16. In an embodiment, the first layer 51 is closer to the support 30 than the second layer 52. Alternatively, the second layer 52 is closer to the support 30 than the first layer 51. In another embodiment, the first and second layers 51, 52 include binder, for example gelatin, and the first and second metallic micro-wires 152, 154 include silver. The first and second metallic micro-wires 152, 154 can be constructed using the methods described above for the pad micro-wires 24 and interstitial micro-wires 22 for the first and second transparent electrodes 130, 132.

As shown in FIG. 14, the electronic device 8 further can include a plurality of transparent conductor areas 40, each forming a transparent electrode (e.g. 130, 132) having a length and a width. In one embodiment as shown in FIG. 2A, the width of the first and second transparent electrodes 130, 132 varies along the length of the first and second transparent electrodes 130, 132 to form wide and narrow transparent electrode areas. The first metallic micro-wires 152 are provided in wide transparent electrode areas (for example the first and second pad areas 128, 129) and the second metallic micro-wires 154 are provided in the narrow transparent electrode areas (for example the first and second interstitial areas 12, 14).

In one embodiment, the first micro-pattern is the same as the second micro-pattern (e.g. as shown in FIG. 3). In another embodiment, the first micro-pattern is different from the second micro-pattern (e.g. as shown in FIGS. 14 and 15). In a further embodiment as illustrated in FIGS. 15 and 16, the second height H2 is at least 30% less than the first height H1.

The second micro-wires 154 can have a greater conductivity than the first micro-wires 152. The second micro-wires 154 can be made of the same, or different, materials as the first micro-wires 152. The metallic first and second micro-wires 152, 154 can occupy an area less than or equal to 10% of the area of the transparent conductor area 40. The transparent conductor area 40 can have a transparency greater than 80% transmittance to light at 550 nm and the combined transparency of the support 30 and the transparent conductor area 40 is greater than 80% in a wavelength range of 450 to 650 nm.

It is known in the art that some touch screen designs using micro-wires 150 can optionally include "dummy areas" outside the conductive areas where conductive micro-wires 150 are formed, but are not electrically connected to any addressable electrode, for primarily optical purposes. Although the conductive areas can be transparent, they can have slightly more light absorption than neighboring non-conductive areas. This can sometimes be observed by a viewer. Thus, in order to maintain a uniform appearance, dummy areas include some micro-wire patterns to maintain a similar overall light absorption. In the embodiments above, when dummy areas are desired, it is preferred to use micro-wires 150 that have a smaller height than the height of the interstitial micro-wires 22 or first micro-wires 152 since the dummy area micro-wires 150 do not need to conduct electricity and can therefore have a lower conductivity without deleteriously affecting the performance of the touch screen. For example, the dummy area micro-wires 150 can have a height comparable to pad micro-wires or second micro-wires 154. In another embodiment, the dummy area micro-wires 150 have a height smaller than any of the transparent conductive area micro-wires 150.

Figure 17:
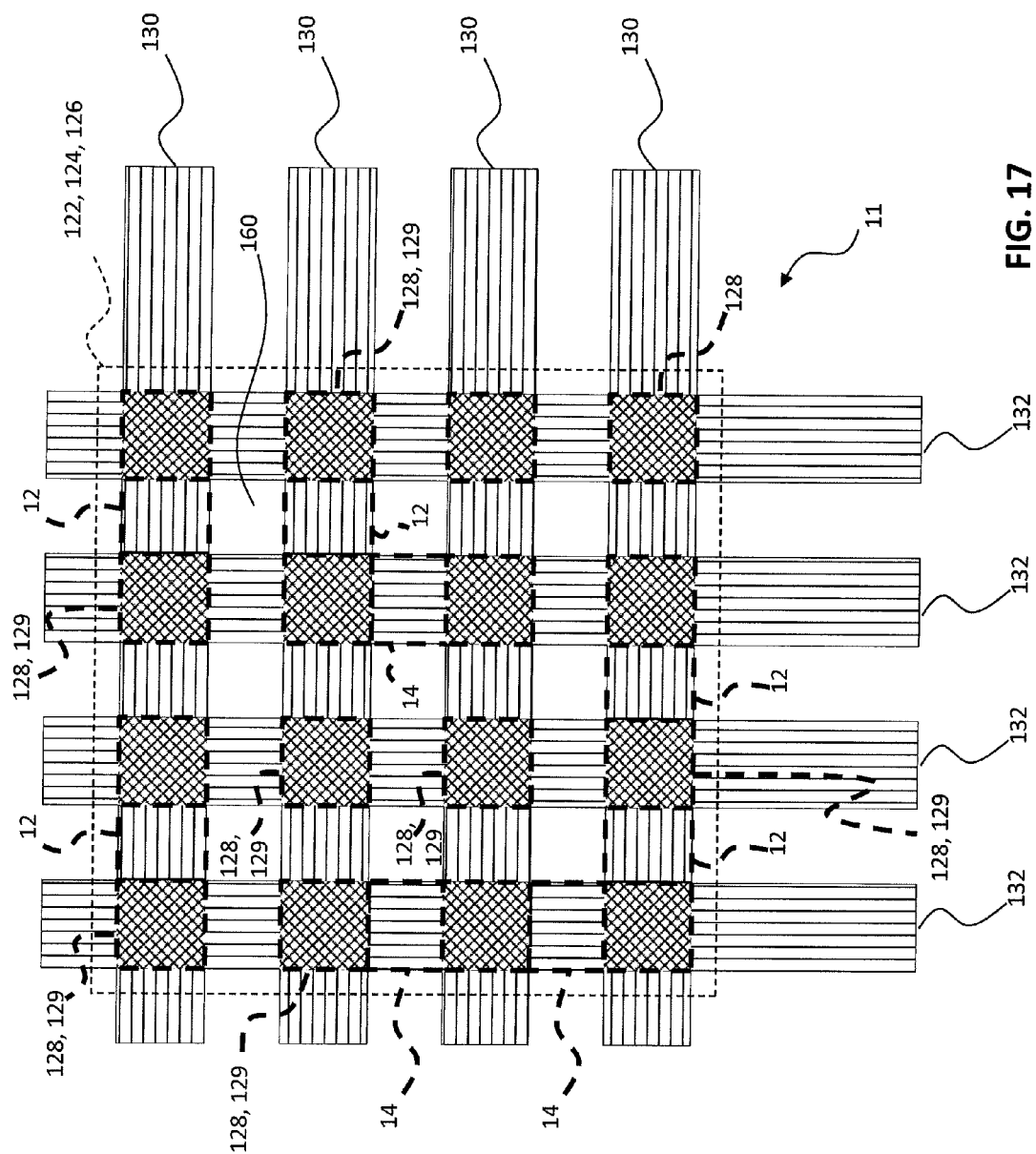
FIG. 17 is a top-view schematic of a transparent conductor apparatus having dummy areas in an embodiment of the present invention.
Figure 18:
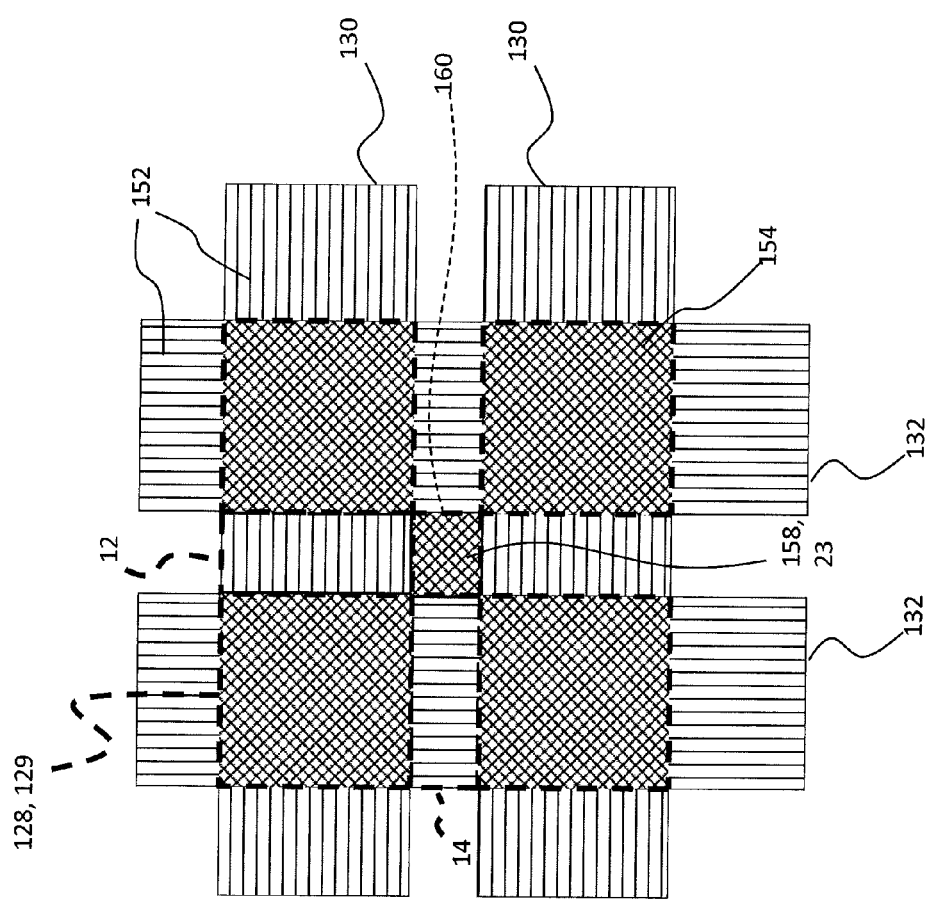
FIG. 18 is a top-view detail schematic of a transparent conductor apparatus having dummy areas in an embodiment of the present invention.

Therefore, referring to FIGS. 17 and 18, in one embodiment of the present invention, a transparent conductor apparatus 11 includes a first transparent substrate 122, a plurality of electrically connected first micro-wires 152 formed in a plurality of first interstitial areas 12 in a micro-wire layer, a plurality of electrically connected second micro-wires 154 formed in a plurality of second areas 128 in the micro-wire layer, the first micro-wires 152 electrically connected to the second micro-wires 154, and a plurality of third micro-wires 158 formed in a plurality of third areas (e.g. dummy area 160) in the micro-wire layer, the third micro-wires 158 electrically disconnected from the first micro-wires 152 and the second micro-wires 154. The first transparent substrate 122 supports the micro-wire layer and the height of at least a portion of the first or second micro-wires 152, 154 is greater than the height of at least a portion of the third micro-wires 158. The first interstitial areas 12 can correspond to first or second interstitial areas 12, 14, the second areas can correspond to pad areas 128, 129, and the third areas can correspond to dummy areas 160.

In various embodiments, the height of at least a portion of the first micro-wires 152 and second micro-wires 154 is greater than the height of at least a portion of the third micro-wires 158. Alternatively, the height of at least a portion of the first micro-wires 152, the second micro-wires 154, and the third micro-wires 158 are different. For example, the height of at least a portion of the first micro-wires 152 is greater than at least a portion of the second micro-wires 154 and at least a portion of the second micro-wires 154 is greater than at least a portion of the third micro-wires 158.

In an embodiment, the width of the third micro-wires 158 is the same as the width of the first micro-wires 152 or the second micro-wires 154. By making the width or micro-pattern of the micro-wires 150 in the different areas the same, optical uniformity is enhanced. Thus, in a further embodiment, the third micro-wires 158 form a micro-pattern that is the same as a micro-pattern formed by the first micro-wires 152 or is the same as a micro-pattern formed by the second micro-wires 154.

To enable efficient manufacturing and further improve optical uniformity, in an embodiment the third micro-wires 158 and the first or second micro-wires 152, 154 are made of the same material. Useful materials include a metal, a metal alloy, or include cured or sintered metal particles. Such metals can be nickel, tungsten, silver, gold, titanium, or tin or include nickel, tungsten, silver, gold, titanium, or tin.

In a further embodiment of the present invention, a transparent substrate (e.g. 122, 123, 126) is a support having greater than 80% transmittance to light at 550 nm and further includes a transparent conductor area having the first, second, and third micro-wires 152, 154, 158. The first second, and third micro-wires 152, 154, 158 each have a width in a range from 0.5 um to 20 um and occupy an area less than 15% of the transparent conductor area. Such an arrangement improves the transparency of the transparent conductor apparatus 11.

In another embodiment of the present invention and referring to FIGS. 1A, 1B 2A, 2B, 3, 17, and 18, a touch-responsive capacitive apparatus 10 includes a first transparent substrate 122. A plurality of electrically connected first pad micro-wires 24 are formed in a plurality of first pad areas 128 in a first micro-wire layer and a plurality of electrically connected first interstitial micro-wires 22 are formed in a plurality of first interstitial areas 12 in the first micro-wire layer, the first pad micro-wires 24 electrically connected to the interstitial micro-wires 22. A plurality of electrically connected second pad micro-wires 24 are formed in a plurality of second pad areas 129 in a second micro-wire layer and a plurality of electrically connected second interstitial micro-wires 22 are formed in a plurality of second interstitial areas 14 in the second micro-wire layer, the second pad micro-wires 24 electrically connected to the second interstitial micro-wires 22. A plurality of first dummy micro-wires 23 are formed in a plurality of dummy areas 160 in the first micro-wire layer, the dummy micro-wires electrically disconnected from the first interstitial micro-wires 22 and from first pad micro-wires 24. Pairs of first and second pad areas 128, 129 define corresponding touch-responsive capacitors, the first transparent substrate 122 supports the first or second micro-wire layers and the height of at least a portion of the first interstitial micro-wires 22 or first pad micro-wires 24 is greater than the height of at least a portion of the first dummy micro-wires 23. Dummy areas 160 are discussed in the above-referenced U.S. Patent Publication 2011/0289771.

In a further embodiment, a plurality of dummy micro-wires 23 are formed in a plurality of dummy areas 160 in the second micro-wire layer, the dummy micro-wires 23 electrically disconnected from the interstitial micro-wires 22 in the second micro-wire layer or from the pad micro-wires 24 in the second micro-wire layer. The height of at least a portion of the interstitial micro-wires or pad micro-wires 22, 24 is greater than the height of at least a portion of the dummy micro-wires 23.

Referring to FIG. 20A, a first transparent substrate 122 has an interstitial micro-wire 22 and a dummy micro-wire 23 formed thereon, the interstitial micro-wire 22 having a greater height than the dummy micro-wire 23. This corresponds to a cross section having a first interstitial area 12 and dummy area 160. Referring to FIG. 20B, a first transparent substrate 122 has a pad micro-wire 24 and a dummy micro-wire 23 formed thereon, the pad micro-wire 24 also having a greater height than the dummy micro-wire 23. This corresponds to a cross section having a first interstitial area 12 and dummy area 160. In comparing FIGS. 20A and 20B, the interstitial micro-wire 22 has a height greater than the height of the pad micro-wire 24 (as is also shown in FIGS. 4A and 4B).

In an embodiment, for example that of FIG. 18, and also referring to FIGS. 19A and 19B, the first dummy areas 162 overlap the second dummy areas 164 so that the dummy micro-wires 23 are offset. In another embodiment (not shown), the first dummy areas 162 are adjacent to the second dummy areas 164.

Referring to FIG. 18, the dummy micro-wires 23 are aligned in the overlapping dummy areas 160 so that, in a top view, only the micro-wires 150 in the first micro-wire layer can be seen. The micro-wires 150 (not shown) in the first micro-layer obscure the micro-wires 150 in the second micro-layer. In another embodiment illustrated in FIG. 19C, the first dummy micro-wires 23 in the first micro-wire layer are offset with respect to the second dummy micro-wires 23 in the second micro-layer. In other embodiments, only the first or the second dummy areas 160 has micro-wires 23.

In one arrangement useful in an embodiment of the present invention and illustrated in FIG. 18, the first interstitial area 12, the first pad area 128, the second interstitial area 14 and the first dummy area 160 are four quadrants of a rectangular area.

In a further embodiment of the present invention, a transparent substrate (e.g. 122, 123, 126) is a support 30 having greater than 80% transmittance to light at 550 nm. A transparent conductor area 40 has interstitial micro-wires 22, pad micro-wires 24, and dummy micro-wires 23. The interstitial micro-wires 22, pad micro-wires 24, and dummy micro-wires 23 each have a width in a range from 0.5 um to 20 um and occupy an area less than 15% of the transparent conductor area 40.

In another embodiment, the transparent conductors are connected to bus lines having a width significantly greater than the micro-wires. Bus lines are often outside of an intended viewing area. Nevertheless, the bus lines can be formed in a manner similar to the interstitial micro-wires 22 or first micro-wires 152 so that their height is greater than the height of the pad micro-wires 24 or interstitial micro-wires 22. This can reduce resistivity of bus lines.

Although the present invention has been described with emphasis on capacitive touch screen embodiments, the transparent electrode structures are useful in a wide variety of electronic devices. Such devices can include, for example, photovoltaic devices, OLED displays and lighting, LCD displays, plasma displays, inorganic LED displays and lighting, electrophoretic displays, electrowetting displays, dimming mirrors, smart windows, transparent radio antennae, transparent heaters and other touch screen devices such as resistive touch screen devices.

The invention has been described in detail with particular reference to certain embodiments thereof, but it will be understood that variations and modifications can be effected within the spirit and scope of the invention.

PARTS LIST

A cross-section line
H1 height 1
H2 height 2
H3 height 3
H4 height 4
L1 light of spectrum one
L2 light of spectrum two
8 electronic device
10 touch-responsive capacitor apparatus
11 transparent conductor apparatus
12 first interstitial area, first area
14 second interstitial area, first area
22 interstitial micro-wires, tall micro-wire
23 dummy micro-wires
24 pad micro-wires, short micro-wire
26 first locations
28 second locations
30 support
40 transparent conductor area
51 first layer
52 second layer
100 touch screen and display system
110 display
120 touch screen
122 first transparent substrate
123 transparent substrate
123A first side
123B second side
124 dielectric layer
126 second transparent substrate
128 first pad area, second area
129 second pad area, second area
130 x-dimension first transparent electrodes
132 y-dimension second transparent electrodes
134 electrical buss connections
136 electrical buss connections
140 touch screen controller
142 display controller
150 micro-wires
152 first micro-wires
154 second micro-wires
156 micro-pattern
158 third micro-wires
160 dummy area
162 first dummy area
164 second dummy area
200 provide transparent substrate step
205 form micro-wires step
210 form micro-wires in pad areas step
215 form micro-wires in interstitial areas step
220 form micro-wires in pad and interstitial areas step
225 add micro-wire material in interstitial areas step
230 form spectrally-sensitive first layer step
235 form spectrally-sensitive second layer step
240 expose first layer step
245 expose second layer step
250 process first and second layers step
260 pattern-wise deposit liquid materials step
265 process patterned liquid materials step
270 deposit layer 1 materials step
275 process layer 1 materials step
280 deposit layer 2 materials step 285 process layer 2 materials step
300 deposit layer 1 materials step
305 pattern-wise expose layer 1 materials step
310 process layer 1 materials step
315 deposit layer 2 materials step
320 pattern-wise expose layer 2 materials step
325 process layer 2 materials step
401 first layer
402 second layer
405 printing plate
410 first raised area
415 second raised area
420 material

The invention claimed is:

1. A touch-responsive capacitive apparatus, comprising:
a transparent substrate;
a plurality of electrically connected first pad micro-wires formed in a plurality of first pad areas in a first micro-wire layer and a plurality of electrically connected first interstitial micro-wires formed in a plurality of first interstitial areas in the first micro-wire layer, the first pad micro-wires electrically connected to the first interstitial micro-wires;
a plurality of electrically connected second pad micro-wires formed in a plurality of second pad areas in a second micro-wire layer and a plurality of electrically connected second interstitial micro-wires formed in a plurality of second interstitial areas in the second micro-wire layer, the second pad micro-wires electrically connected to the second interstitial micro-wires; and
wherein pairs of first and second pad areas define corresponding touch-responsive capacitors, the transparent substrate supports the first or second micro-wire layers, and the height of at least a portion of the first interstitial micro-wires is greater than the height of at least a portion of the first pad micro-wires and wherein the width of the first interstitial micro-wires is the same as the width of the first pad micro-wires.

2. The touch-responsive capacitive apparatus according to claim 1, wherein the height of at least a portion of the second interstitial micro-wires is greater than the height of at least a portion of the second pad micro-wires.

3. The touch-responsive capacitive apparatus according to claim 1, further including a dielectric layer having a first side adjacent the first micro-wire layer and a second side opposite the first side adjacent the second micro-wire layer.

4. The touch-responsive capacitive apparatus according to claim 3, wherein the transparent substrate provides the dielectric layer or the dielectric layer is separate from the transparent substrate.

5. The touch-responsive capacitive apparatus according to claim 1, wherein the transparent substrate has a first side and a second side opposed to the first side, and wherein the first micro-wire layer is formed on the first side and the second micro-wire layer is formed on the second side.

6. The touch-responsive capacitive apparatus according to claim 1, wherein the width of the second interstitial micro-wires is the same as the width of the second pad micro-wires.

7. Touch-responsive capacitor apparatus, comprising:
a transparent substrate having first and second sides;
a plurality of first pad micro-wires formed in a plurality of spaced-apart first pad areas in a first micro-wire layer over or on the first side and a plurality of first interstitial micro-wires formed in a plurality of spaced-apart first interstitial areas spaced apart from the first pad areas in the first micro-wire layer, the first interstitial micro-wires electrically connected to the first pad micro-wires;
a plurality of second pad micro-wires formed in a plurality of spaced-apart second pad areas in a second micro-wire layer under or on the second side and a plurality of second interstitial micro-wires formed in a plurality of spaced-apart second interstitial areas in the second micro-wire layer, the second interstitial micro-wires electrically connected to the second pad micro-wires;
a dielectric layer located between the first and second micro-wire layers; and
wherein the first and second pad areas define corresponding touch-responsive capacitors whose capacitance changes in response to a touch, and the height of the first interstitial micro-wires is greater than the height of the first pad micro-wires or the height of at least a portion of the second interstitial micro-wires is greater than the height of at least a portion of the second pad micro-wires.

8. The touch-responsive capacitive apparatus according to claim 7, wherein the width of the first interstitial micro-wires is the same as the width of the first pad micro-wires.

9. The touch-responsive capacitive apparatus according to claim 7, wherein one or more first pad micro-wires in a first pad area is electrically connected to one or more first pad micro-wires in a different first pad area by one or more first interstitial micro-wires.

10. The touch-responsive capacitive apparatus according to claim 7, wherein the transparent substrate has a surface and a first pad area is adjacent to a second pad area in a direction parallel to the surface.

11. The touch-responsive capacitive apparatus according to claim 7, wherein the transparent substrate has a surface and a first pad area is adjacent to a second pad area in a direction orthogonal to the surface.

12. The touch-responsive capacitive apparatus according to claim 7, wherein the first micro-wire layer is formed on a first transparent substrate and the second micro-wire layer is formed on a second transparent substrate different from the first transparent substrate.

13. The touch-responsive capacitor apparatus according to claim 7, wherein the transparent substrate provides the dielectric layer or the dielectric layer is separate from the transparent substrate.

14. The touch-responsive capacitor apparatus according to claim 7, wherein the first pad micro-wires are made of a different material than the first interstitial micro-wires.

15. The touch-responsive capacitor apparatus of claim 7, wherein one or more of the first interstitial micro-wires has a different height from one or more other first interstitial micro-wires.

16. The touch-responsive capacitive apparatus according to claim 7, wherein the transparent substrate has a first side and a second side opposed to the first side, and wherein the first micro-wire layer is formed on the first side and the second micro-wire layer is formed on the second side.

17. The touch-responsive capacitive apparatus according to claim 7, wherein the width of the second interstitial micro-wires is the same as the width of the second pad micro-wires.

18. The touch-responsive capacitive apparatus according to claim 7, wherein the first or second pad or interstitial micro-wires are a metal, a metal alloy, or include cured or sintered metal particles.

19. The touch-responsive capacitive apparatus according to claim 18, wherein the metal is nickel, tungsten, silver, gold, titanium, or tin or includes nickel, tungsten, silver, gold, titanium, or tin.

* * * * *